(12) United States Patent
Yu

(10) Patent No.: US 11,803,032 B2
(45) Date of Patent: Oct. 31, 2023

(54) CAMERA OPTICAL LENS

(71) Applicant: AAC Optics (Changzhou) Co., Ltd., Changzhou (CN)

(72) Inventor: Dong Yu, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 437 days.

(21) Appl. No.: 17/134,198

(22) Filed: Dec. 25, 2020

(65) Prior Publication Data

US 2022/0011550 A1    Jan. 13, 2022

(30) Foreign Application Priority Data

Jul. 13, 2020   (CN) .......................... 202010666137.6

(51) Int. Cl.
```
G02B 9/60       (2006.01)
G02B 13/00      (2006.01)
G02B 13/06      (2006.01)
G02B 27/00      (2006.01)
```
(52) U.S. Cl.
CPC ........... *G02B 9/60* (2013.01); *G02B 13/0045* (2013.01); *G02B 13/06* (2013.01); *G02B 27/0025* (2013.01)

(58) Field of Classification Search
None
See application file for complete search history.

(56) References Cited

U.S. PATENT DOCUMENTS

| | | | |
|---|---|---|---|
| 2013/0314804 A1* | 11/2013 | Kubota | G02B 5/005 359/757 |
| 2019/0121071 A1* | 4/2019 | Zhao | G02B 9/64 |
| 2019/0310443 A1* | 10/2019 | Nitta | G02B 9/62 |

* cited by examiner

*Primary Examiner* — Darryl J Collins
(74) *Attorney, Agent, or Firm* — W&G Law Group

(57) ABSTRACT

A camera optical lens includes a first lens having a positive refractive power, a second lens having a refractive power, a third lens having a negative refractive power, a fourth lens having a positive refractive power, and a fifth lens having a negative refractive power, which are sequentially arranged from an object side to an image side. $0.90 \leq f1/f \leq 1.20$, $5.00 \leq (R3+R4)/(R3-R4) \leq 30.00$, $3.00 \leq d5/d6 \leq 10.00$, and $-15.00 \leq (R5+R6)/(R5-R6) \leq -3.00$. f denotes a focal length of the camera optical lens, f1 denotes a focal length of the first lens, R3 denotes a curvature radius of an object-side surface of the second lens, R4 denotes a curvature radius of an image-side surface of the second lens, and R5 denotes a curvature radius of an object-side surface of the third lens. The camera optical lens has good optical performance and meets the design requirements of a large aperture, a wide angle, and ultra-thinness.

9 Claims, 12 Drawing Sheets

CAMERA OPTICAL LENS

TECHNICAL FIELD

The present disclosure relates to the field of optical lenses, and more particularly, to a camera optical lens suitable for handheld terminal devices such as smart phones and digital cameras, as well as camera devices such as monitors and PC lenses.

BACKGROUND

With development of camera technology, camera optical lenses are widely used in various electronic products, such as smart phones, digital cameras, etc. In order to achieve portability, people are increasingly pursuing for thinner and lighter electronic products. Therefore, a miniaturized camera optical lens with a good imaging quality has become a mainstream in the market.

In order to obtain a better imaging quality, the camera lens traditionally equipped with mobile phone camera mostly adopts a structure including three lenses or four lenses. However, with development of technology and increased diversified requirements of the users, in a case where a pixel area of a photosensitive device gradually decreases and the requirement in the imaging quality gradually increases, camera lens having a structure have gradually appeared in lens design. Although the conventional camera lens including five lenses has a good optical performance, there is still some irrationality in terms of focal power, a lens spacing and a lens shape. As a result, the lens structure having good optical performance cannot meet the design requirements of a large aperture, a wide angle, and ultra-thinness.

Therefore, it needs to provide a camera optical lens that has good optical performance and meets the design requirements of a large aperture, a wide angle, and ultra-thinness.

SUMMARY

A purpose of the present disclosure is to provide a camera optical lens, aiming to solve the problems of insufficient large aperture, wide angle, and ultra-thinness of the conventional camera optical lens.

A camera optical lens includes a first lens, a second lens, a third lens, a fourth lens, and a fifth lens that are sequentially arranged from an object side to an image side. The first lens has a positive refractive power, the second lens has a refractive power, the third lens has a negative refractive power, the fourth lens has a positive refractive power, and the fifth lens has a negative refractive power. The camera optical lens satisfies: $0.90 \leq f1/f \leq 1.20$, $50.00 \leq (R3+R4)/(R3-R4) \leq 30.00$, $30.00 \leq d5/d6 \leq 10.00$, and $-15.00 \leq (R5+R6)/(R5-R6) \leq -30.00$, where f denotes a focal length of the camera optical lens; f1 denotes a focal length of the first lens; R3 denotes a curvature radius of an object-side surface of the second lens; R4 denotes a curvature radius of an image-side surface of the second lens; R5 denotes a curvature radius of an object-side surface of the third lens; R6 denotes a curvature radius of an image-side surface of the third lens; d5 denotes an on-axis thickness of the third lens; and d6 denotes an on-axis distance from the image-side surface of the third lens to an object-side surface of the fourth lens.

As an improvement, the camera optical lens satisfies: $-0.75 \leq f5/f \leq -0.55$, where f5 denotes a focal length of the fifth lens.

As an improvement, the camera optical lens satisfies: $-2.22 \leq (R1+R2)/(R1-R2) \leq -0.18$ and $0.13 \leq d1/TTL \leq 0.42$, where R1 denotes a curvature radius of an object-side surface of the first lens, R2 denotes a curvature radius of an image-side surface of the first lens, d1 denotes an on-axis thickness of the first lens, and TTL denotes a total optical length from the object-side surface of the first lens to an image plane of the camera optical lens along an optical axis.

As an improvement, the camera optical lens satisfies: $-72.72 \leq f2/f \leq 18.51$, and $0.02 \leq d3/TTL \leq 0.08$, where f2 denotes a focal length of the second lens, d3 denotes an on-axis thickness of the second lens, and TTL denotes a total optical length from an object-side surface of the first lens to an image plane of the camera optical lens along an optical axis.

As an improvement, the camera optical lens satisfies: $-19.24 \leq f3/f \leq -0.85$ and $0.02 \leq d5/TTL \leq 0.10$, where f3 denotes a focal length of the third lens, and TTL denotes a total optical length from an object-side surface of the first lens to an image plane of the camera optical lens along an optical axis.

As an improvement, the camera optical lens satisfies: $0.32 \leq f4/f \leq 1.20$, $-0.40 \leq (R7+R8)/(R7-R8) \leq 0.26$, and $0.06 \leq d7/TTL \leq 0.28$, where f4 denotes a focal length of the fourth lens, R7 denotes a curvature radius of the object-side surface of the fourth lens, R8 denotes a curvature radius of an image-side surface of the fourth lens, d7 denotes an on-axis thickness of the fourth lens, and TTL denotes a total optical length from an object-side surface of the first lens to an image plane of the camera optical lens along an optical axis.

As an improvement, the camera optical lens satisfies: $0.45 \leq (R9+R10)/(R9-R10) \leq 1.97$ and $0.03 \leq d9/TTL \leq 0.13$, where R9 denotes a curvature radius of an object-side surface of the fifth lens, R10 denotes a curvature radius of an image-side surface of the fifth lens, d9 denotes an on-axis thickness of the fifth lens, and TTL denotes a total optical length from an object-side surface of the first lens to an image plane of the camera optical lens along an optical axis.

As an improvement, the camera optical lens satisfies: $TTL/IH \leq 1.50$, where IH denotes an image height of the camera optical lens, and TTL denotes a total optical length from an object-side surface of the first lens to an image plane of the camera optical lens along an optical axis.

As an improvement, the camera optical lens satisfies: $FOV \geq 82.00°$, where FOV denotes a field of view of the camera optical lens.

As an improvement, the camera optical lens satisfies: $0.46 \leq f12/f \leq 1.78$, where f12 denotes a combined focal length of the first lens and the second lens.

The camera optical lens provided by the present disclosure not only has a large aperture as well as good optical performance, but also satisfies the design requirements of a wide angle and ultra-thinness, and is suitable for camera optical lens assembly of mobile phones and WEB camera optical lenses formed by camera elements for high pixel such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further described in details in the following with reference to the accompanying drawings and embodiments.

In order to better illustrate the purpose, technical solutions and advantages of the present disclosure, the embodiments of the present disclosure will be described in details as follows with reference to the accompanying drawings. However, it should be understood by those skilled in the art that, technical details are set forth in the embodiments of the present disclosure so as to better illustrate the present disclosure. However, the technical solutions claimed in the present disclosure can be achieved without these technical details and various changes and modifications based on the following embodiments.

Embodiment 1

Figure 1:
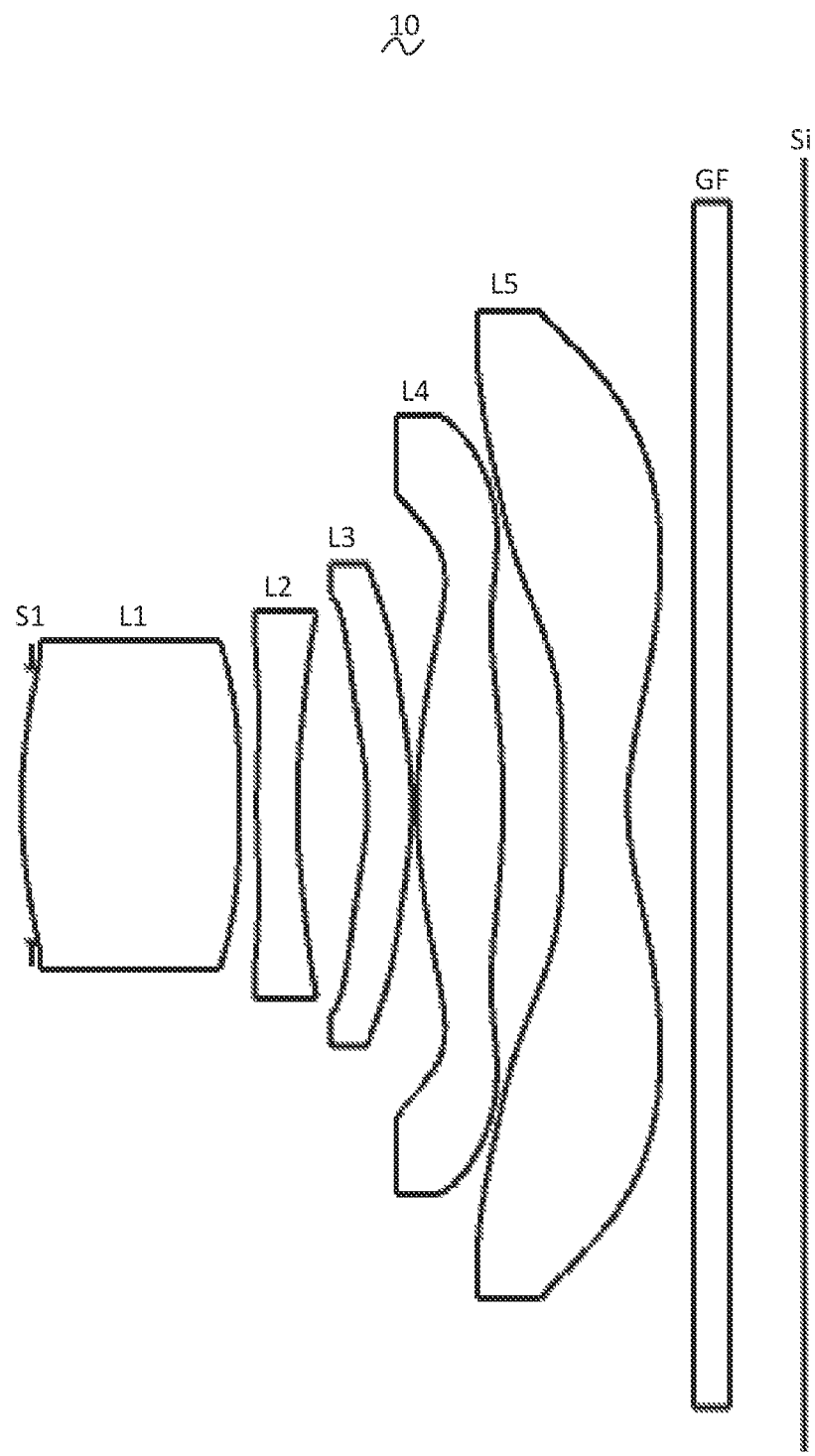
FIG. 1 is a schematic structural diagram of a camera optical lens according to Embodiment 1.

Please refer to FIG. 1 to FIG. 4, Embodiment 1 of the present disclosure provides a camera optical lens 10. As shown in FIG. 1, a left side is an object side, and a right side is an image side. The camera optical lens 10 mainly includes five lenses. From the object side to the image side, an aperture S1, a first lens L1, a second lens L2, a third lens L3, a fourth lens L4, and a fifth lens L5 are sequentially arranged. A glass filter GF is provided between the fifth lens L5 and an image plane Si, and the glass filter GF can be a glass cover plate or an optical filter.

In this embodiment, the first lens L1 has a positive refractive power, the second lens L2 has a negative refractive power, the third lens L3 has a negative refractive power, the fourth lens L4 has a positive refractive power, and the fifth lens L5 has a negative refractive power.

As an example, the first lens L1 is made of a plastic material, the second lens L2 is made of a plastic material, the third lens L3 is made of a plastic material, the fourth lens L4 is made of a plastic material, and the fifth lens L5 is made of a plastic material.

The camera optical lens 10 satisfies the following conditions.

$$0.90 \leq f1/f \leq 1.20 \quad (1),$$

$$5.00 \leq (R3+R4)/(R3-R4) \leq 30.00 \quad (2),$$

$$3.00 \leq d5/d6 \leq 10.00 \quad (3), \text{ and}$$

$$-15.00 \leq (R5+R6)/(R5-R6) \leq -30.00 \quad (4),$$

where f denotes a focal length of the camera optical lens, f1 denotes a focal length of the first lens, R3 denotes a curvature radius of an object-side surface of the second lens, R4 denotes a curvature radius of an image-side surface of the second lens, R5 denotes a curvature radius of an object-side surface of the third lens, R6 denotes a curvature radius of an image-side surface of the third lens, d5 denotes an on-axis thickness of the third lens, and d6 denotes an on-axis distance from the image-side surface of the third lens to an object-side surface of the fourth lens.

The condition (1) specifies a ratio of the focal length f1 of the first lens L1 to the overall focal length f of the camera optical lens 10, and with the condition (1), spherical aberration and field curvature of the system can be effectively balanced.

The condition (2) specifies a shape of the second lens L2, and with the condition (2), a degree of deflection of light passing through the lens can be alleviated, and aberration can be effectively reduced.

The condition (3) specifies a ratio of the on-axis thickness d5 of the third lens L3 to an air spacing between the third and fourth lenses, and with the condition (1), an overall optical length can be reduced to achieve a ultra-thin effect.

The condition (4) specifies a shape of the third lens L3, and with the condition (4), with development of ultra-thinness and a wide angle, it is beneficial to correcting aberration of an off-axis angle.

As an example, the camera optical lens satisfies: $-0.75 \leq f5/f \leq -0.55$, where f denotes an overall focal length of the camera optical lens 10, f5 denotes a focal length of the fifth lens. This condition specifies a ratio of the focal length f5 of the fifth lens L5 to the overall focal length f of the camera optical lens 10. Reasonable distribution of the focal power enables the system to have better imaging quality and lower sensitivity.

The first lens L1 includes an object-side surface being convex in a paraxial region and an image-side surface being convex in the paraxial region.

As an example, the camera optical lens satisfies the following condition: $-2.22 \leq (R1+R2)/(R1-R2) \leq -0.18$, where R1 denotes a curvature radius of an object-side surface of the first lens, and R2 denotes a curvature radius of an image-side surface of the first lens. By controlling the shape of the first lens L1 within a reasonably range, the first lens L1 can effectively correct the spherical aberration of the system. As an example, the camera optical lens satisfies the following condition: $-1.39 \leq (R1+R2)/(R1-R2) \leq -0.23$.

As an example, the camera optical lens satisfies the following condition: $0.13 \leq d1/TTL \leq 0.42$, where d1 denotes an on-axis thickness of the first lens, and TTL denotes a total optical length from the object-side surface of the first lens to an image plane of the camera optical lens along an optical axis. With this condition, it is beneficial to achieving ultra-thinness. As an example, the camera optical lens satisfies the following condition: $0.20 \leq d1/TTL \leq 0.33$.

The second lens L2 includes an object-side surface being convex in a paraxial region and an image-side surface being concave in the paraxial region.

As an example, the camera optical lens satisfies the following condition: $-72.72 \leq f2/f \leq 18.51$, where f denotes a focal length of the camera optical lens, and f2 denotes a focal length of the second lens. By controlling the focal power of the second lens L2 within a reasonable range, it is beneficial to correcting the aberration of the optical system. As an example, the camera optical lens satisfies the following condition: $-45.45 \leq f2/f \leq 14.81$.

As an example, the camera optical lens satisfies the following condition: $0.02 \leq d3/TTL \leq 0.08$, where d3 denotes an on-axis thickness of the second lens, and TTL denotes a total optical length from an object-side surface of the first lens to an image plane of the camera optical lens along an optical axis. With this condition, it is beneficial to achieving ultra-thinness. As an example, the camera optical lens satisfies the following condition: $0.04 \leq d3/TTL \leq 0.06$.

The third lens L3 includes an object-side surface being concave in a paraxial region and an image-side surface being convex in the paraxial region.

As an example, the camera optical lens satisfies the following condition: $-19.24 \leq f3/f \leq -0.85$, where f denotes a focal length of the camera optical lens, and f3 denotes a focal length of the third lens L3. Reasonable distribution of the focal power enables the system to have better imaging quality and lower sensitivity. As an example, the camera optical lens satisfies the following condition: $-12.03 \leq f3/f \leq -1.06$.

As an example, the camera optical lens satisfies the following condition: $0.02 \leq d5/TTL \leq 0.10$, where d5 denotes an on-axis thickness of the third lens L3. With this condition, it is beneficial to achieving ultra-thinness. As an example, the camera optical lens satisfies the following condition: $0.04 \leq d5/TTL \leq 0.08$.

The fourth lens L4 includes an object-side surface being convex in a paraxial region and an image-side surface being convex in the paraxial region.

As an example, the camera optical lens satisfies the following condition: $0.32 \leq f4/f \leq 1.20$, where f denotes a focal length of the camera optical lens, and f4 denotes a focal length of the fourth lens. Reasonable distribution of the focal power enables the system to have better imaging quality and lower sensitivity. As an example, the camera optical lens satisfies the following condition: $0.50 \leq f4/f \leq 0.96$.

As an example, the camera optical lens satisfies the following condition: $-0.40 \leq (R7+R8)/(R7-R8) \leq 0.26$, where R7 denotes a curvature radius of the object-side surface of the fourth lens, and R8 denotes a curvature radius of an image-side surface of the fourth lens. This condition specifies the shape of the fourth lens L4. With this condition and the development of ultra-thinness and a wide angle, it is beneficial to correcting aberration of an off-axis angle. As an example, the camera optical lens satisfies the following condition: $-0.25 \leq (R7+R8)/(R7-R8) \leq 0.21$.

As an example, the camera optical lens satisfies the following condition: $0.06 \leq d7/TTL \leq 0.28$, where d7 denotes an on-axis thickness of the fourth lens, and TTL denotes a total optical length from an object-side surface of the first lens to an image plane of the camera optical lens along an optical axis. With this condition, it is beneficial to achieving ultra-thinness. As an example, the camera optical lens satisfies the following condition: $0.09 \leq d7/TTL \leq 0.23$.

The fifth lens L5 includes an object-side surface being concave in a paraxial region and an image-side surface being concave in the paraxial region.

As an example, the camera optical lens satisfies satisfy the following condition: $0.45 \leq (R9+R10)/(R9-R10) \leq 1.97$, where R9 denotes a curvature radius of an object-side surface of the fifth lens L5, R10 denotes a curvature radius of an image-side surface of the fifth lens L5. This condition specifies a shape of the fifth lens L5. With this condition and the development of ultra-thinness and a wide angle, it is beneficial to correcting aberration of an off-axis angle. As an example, the camera optical lens satisfies the following condition: $0.72 \leq (R9+R10)/(R9-R10) \leq 1.58$.

As an example, the camera optical lens satisfies the following condition: $0.03 \leq d9/TTL \leq 0.13$, where d9 denotes an on-axis thickness of the fifth lens L5, and TTL denotes a total optical length from an object-side surface of the first lens to an image plane of the camera optical lens 10 along an optical axis. With this condition, it is beneficial to achieving ultra-thinness. As an example, the camera optical lens satisfies the following condition: $0.05 \leq d9/TTL \leq 0.10$.

As an example, the camera optical lens satisfies the following condition: $TTL/IH \leq 1.50$, where IH denotes an image height of the camera optical lens, and TTL denotes a total optical length from an object-side surface of the first lens to an image plane of the camera optical lens along an optical axis. With this condition, it is beneficial to achieving ultra-thinness.

As an example, a field of view (FOV) of the camera optical lens 10 is larger than or equal to 82.00°, thereby achieving a wide angle.

As an example, the camera optical lens satisfies the following condition: $0.46 \leq f12/f \leq 1.78$, where f denotes a focal length of the camera optical lens, and f12 denotes a combined focal length of the first lens and the second lens. With this condition, aberration and distortion of the camera optical lens 10 can be eliminated, and a back focus of the camera optical lens 10 can be suppressed to maintain miniaturization of the image lens system group. As an example, the camera optical lens satisfies the following condition: $0.74 \leq f12/f \leq 1.43$.

In addition, in the camera optical lens 10 provided by this embodiment, a surface of each lens can be designed as an aspherical surface, and the aspherical surface can be easily made into a shape other than a spherical surface to obtain more control variables, thereby eliminating and reducing aberration and reducing the number of lenses used in the camera optical lens 10. Therefore, the length of the camera optical lens 10 can be effectively reduced. As an example, the object-side surface and the image-side surface of each lens are aspherical surfaces.

Since the first lens L1, the second lens L2, the third lens L3, the fourth lens L4, and the fifth lens L5 have the aforementioned structure and parameter relationship, the camera optical lens 10 can reasonably distribute the focal power, distances and shapes of the respective lenses, thereby correcting various aberrations.

In this way, the camera optical lens 10 not only has good optical imaging performance, but also meets the design requirements of a large aperture, a wide angle, and ultra-thinness.

The camera optical lens 10 of the present disclosure will be described in the following by examples. The reference signs described in each example are as follows. The unit of the focal length, the on-axis distance, the curvature radius, the on-axis thickness, the inflexion point position, and arrest point position is mm.

TTL: optical length (an on-axis distance from the object-side surface of the first lens L1 to the image plane S1), in a unit of mm.

In addition, at least one of the object-side surface and the image-side surface of each lens can also be provided with an inflexion point and/or an arrest point to meet high-quality imaging requirements. For specific implementation manners, please refer to the following description.

The following shows design data of the camera optical lens 10 shown in FIG. 1.

Table 1 illustrates Embodiment 1 the curvature radius of the object-side surface and the curvature radius R of the image-side surface, the on-axis thickness, the refractive index nd and the abbe number vd of each of the first lens L1 to the fifth lens L5 of the camera optical lens 10, and the distance d between two adjacent lenses. In the embodiment, the unit of R and the unit of d are both millimeters (mm).

TABLE 1

|     | R       | d    |       | nd     |     | vd    |
|-----|---------|------|-------|--------|-----|-------|
| S1  | ∞       | d0=  | −0.055 |        |     |       |
| R1  | 2.231   | d1=  | 1.217 | nd1    | 1.5444 | v1 | 55.82 |
| R2  | −13.092 | d2=  | 0.095 |        |     |       |
| R3  | 3.300   | d3=  | 0.228 | nd2    | 1.6700 | v2 | 19.39 |
| R4  | 3.054   | d4=  | 0.390 |        |     |       |
| R5  | −1.118  | d5=  | 0.247 | nd3    | 1.6700 | v3 | 19.39 |
| R6  | −1.723  | d6=  | 0.030 |        |     |       |
| R7  | 1.920   | d7=  | 0.483 | nd4    | 1.5444 | v4 | 55.82 |
| R8  | −2.627  | d8=  | 0.334 |        |     |       |
| R9  | −26.754 | d9=  | 0.361 | nd5    | 1.5346 | v5 | 55.69 |
| R10 | 1.141   | d10= | 0.364 |        |     |       |
| R11 | ∞       | d11= | 0.210 | ndg    | 1.5168 | vg | 64.17 |
| R12 | ∞       | d12= | 0.413 |        |     |       |

The representation of each reference sign in the above table is as follows.

S1: aperture;
R: curvature radius at a center of the optical surface;
R1: curvature radius of an object-side surface of a first lens L1;
R2: curvature radius of an image-side surface of the first lens L1;
R3: curvature radius of an object-side surface of a second lens L2;
R4: curvature radius of an image-side surface of the second lens L2;
R5: curvature radius of an object-side surface of a third lens L3;
R6: curvature radius of an image-side surface of the third lens L3;
R7: curvature radius of an object-side surface of a fourth lens L4;
R8: curvature radius of an image-side surface of the fourth lens L4;
R9: curvature radius of an object-side surface of a fifth lens L5;
R10: curvature radius of an image-side surface of the fifth lens L5;
R11: curvature radius of an object-side surface of an optical filter GF;
R12: curvature radius of an image-side surface of the optical filter GF;
d: on-axis thickness of the lens, on-axis distance between lenses;
d0: on-axis distance from the aperture S1 to the object-side surface of the first lens L1;
d1: on-axis thickness of the first lens L1;
d2: on-axis distance from the image-side surface of the first lens L1 to the object-side surface of the second lens L2;
d3: on-axis thickness of the second lens L2;
d4: on-axis distance from the image-side surface of the second lens L2 to the object-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the optical filter GF;
d11: on-axis thickness of optical filter GF;
d12: on-axis distance from the image-side surface of the optical filter GF to the image plane;
nd: refractive index of d-line;
nd1: reactive index of the d-line of the first lens L1;
nd2: reactive index of d-line of the second lens L2;
nd3: refractive index of d-line of the third lens L3;
nd4: reactive index of d-line of the fourth lens L4;
nd5: reactive index of d-line of the fifth lens L5;
ndg: refractive index of d-line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5; and
vg: abbe number of the optical filter GF.

Table 2 shows the aspherical surface data of each lens of the camera optical lens 10 according to the Embodiment 1 of the present disclosure.

TABLE 2

|    | Conic coefficient | Aspherical coefficient | | | |
|----|-------------------|------|------|------|------|
|    | k                 | A4   | A6   | A8   | A10  |
| R1 | −1.3467E+01 | 8.8134E−02 | 3.9966E−01 | −4.9522E+00 | 2.4871E+01 |
| R2 | 2.3153E+01  | −3.9442E−01 | −4.5947E−01 | 3.5365E+00 | 2.1764E+00 |
| R3 | −5.9778E+01 | −9.0401E−02 | −1.9684E+00 | 4.3421E+00 | 1.5499E+01 |
| R4 | −6.4769E+01 | 3.9322E−01 | −1.9655E+00 | 4.1258E+00 | −3.1242E+00 |
| R5 | −1.1647E+01 | −1.8191E−02 | 2.1025E+00 | −8.4634E+00 | 1.7088E+01 |
| R6 | −1.0731E+01 | 1.0166E−02 | −1.6957E−02 | 3.8375E+00 | −1.8943E+01 |
| R7 | −1.2802E+01 | −1.5643E−01 | 4.9967E−01 | −6.6141E−01 | 3.3735E−01 |

TABLE 2-continued

| | | | | | |
|---|---|---|---|---|---|
| R8 | 7.7177E−01 | 3.3315E−01 | −9.3113E−01 | 1.9266E+00 | −2.1051E+00 |
| R9 | 8.6598E+01 | −2.3303E−01 | −1.2236E−01 | 3.7856E−01 | −2.6477E−01 |
| R10 | −5.9088E+00 | −1.7612E−01 | 1.1145E−01 | −5.0319E−02 | 1.6687E−02 |

| | Aspherical coefficient | | | | |
|---|---|---|---|---|---|
| | A12 | A14 | A16 | A18 | A20 |
| R1 | −6.1511E+01 | 3.4472E+01 | 1.7592E+02 | −3.9066E+02 | 2.4891E+02 |
| R2 | −5.9142E+01 | 2.0117E+02 | −3.3324E+02 | 2.8295E+02 | −9.8550E+01 |
| R3 | −1.0197E+02 | 2.5166E+02 | −3.3616E+02 | 2.3879E+02 | −7.0523E+01 |
| R4 | −1.4995E−01 | −3.9474E+00 | 1.5102E+01 | −1.6412E+01 | 6.0586E+00 |
| R5 | −2.3586E+01 | 2.7679E+01 | −2.7518E+01 | 1.7764E+01 | −5.0271E+00 |
| R6 | 4.1029E+01 | −4.9161E+01 | 3.3945E+01 | −1.2692E+01 | 1.9958E+00 |
| R7 | 9.5262E−02 | −2.2628E−01 | 1.1343E−01 | −2.2045E−02 | 1.1878E−03 |
| R8 | 1.3247E+00 | −5.0480E−01 | 1.1548E−01 | −1.4612E−02 | 7.8610E−04 |
| R9 | 8.9026E−02 | −1.4932E−02 | 8.5800E−04 | 6.8453E−05 | −8.3790E−06 |
| R10 | −4.4297E−03 | 8.6817E−04 | −1.0845E−04 | 7.2313E−06 | −1.7844E−07 |

In Table 2, k represents a conic coefficient, and A4, A6, A8, A10, A12, A14, A16, A18, and A20 represents aspherical surface coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (5),$$

where x denotes a vertical distance between a point on an aspherical curve and an optical axis, and y represents an aspherical depth (a vertical distance between a point on an aspherical surface, having a distance of x from the optical axis, and a surface tangent to a vertex of the aspherical surface on the optical axis).

For convenience, the aspherical surface of each lens adopts the aspherical surface shown in the above equation (5). However, the present disclosure is not limited to the aspherical polynomial form expressed by the equation (5).

Table 3 and Table 4 show the design data of the inflexion point and the arrest point of each lens of the camera optical lens 10 according to the embodiment. P1R1 and P1R2 respectively represent the object-side surface and image-side surface of the first lens L1, P2R1 and P2R2 respectively represent the object-side surface and image-side surface of the second lens L2, P3R1 and P3R2 respectively represent the object-side surface and the image-side surface of the third lens L3, P4R1 and P4R2 respectively represent the object-side surface and image-side surface of the fourth lens L4, and P5R1 and P5R2 respectively represent the object-side surface and image-side surface of the fifth lens L5. The corresponding data in the "inflexion point position" column is a vertical distance from the inflexion point on a surface of each lens to the optical axis of the camera optical lens 10. The corresponding data in the "arrest point position" column is a vertical distance from the arrest point on a surface of each lens to the optical axis of the camera optical lens 10.

TABLE 3

| | Number of inflexion points | Inflexion point position 1 | Inflexion point position 2 | Inflexion point position 3 |
|---|---|---|---|---|
| P1R1 | 0 | / | / | / |
| P1R2 | 0 | / | / | / |
| P2R1 | 2 | 0.245 | 0.665 | / |
| P2R2 | 0 | / | / | / |
| P3R1 | 2 | 0.345 | 0.605 | / |
| P3R2 | 3 | 0.475 | 0.515 | 1.075 |
| P4R1 | 3 | 0.785 | 1.395 | 1.475 |

TABLE 3-continued

| | Number of inflexion points | Inflexion point position 1 | Inflexion point position 2 | Inflexion point position 3 |
|---|---|---|---|---|
| P4R2 | 2 | 0.555 | 1.085 | / |
| P5R1 | 2 | 0.975 | 2.105 | / |
| P5R2 | 2 | 0.485 | 2.265 | / |

TABLE 4

| | Number of arrest points | Arrest point position 1 | Arrest point position 2 |
|---|---|---|---|
| P1R1 | 0 | / | / |
| P1R2 | 0 | / | / |
| P2R1 | 2 | 0.415 | 0.835 |
| P2R2 | 0 | / | / |
| P3R1 | 0 | / | / |
| P3R2 | 0 | / | / |
| P4R1 | 1 | 1.075 | / |
| P4R2 | 2 | 0.855 | 1.275 |
| P5R1 | 0 | / | / |
| P5R2 | 1 | 1.185 | / |

In addition, in the following Table 17, the values corresponding to the various parameters in the Embodiments 1-4 and the parameters already specified in the conditions are listed.

As shown in Table 17, the Embodiment 1 satisfies each condition.

Figure 2:
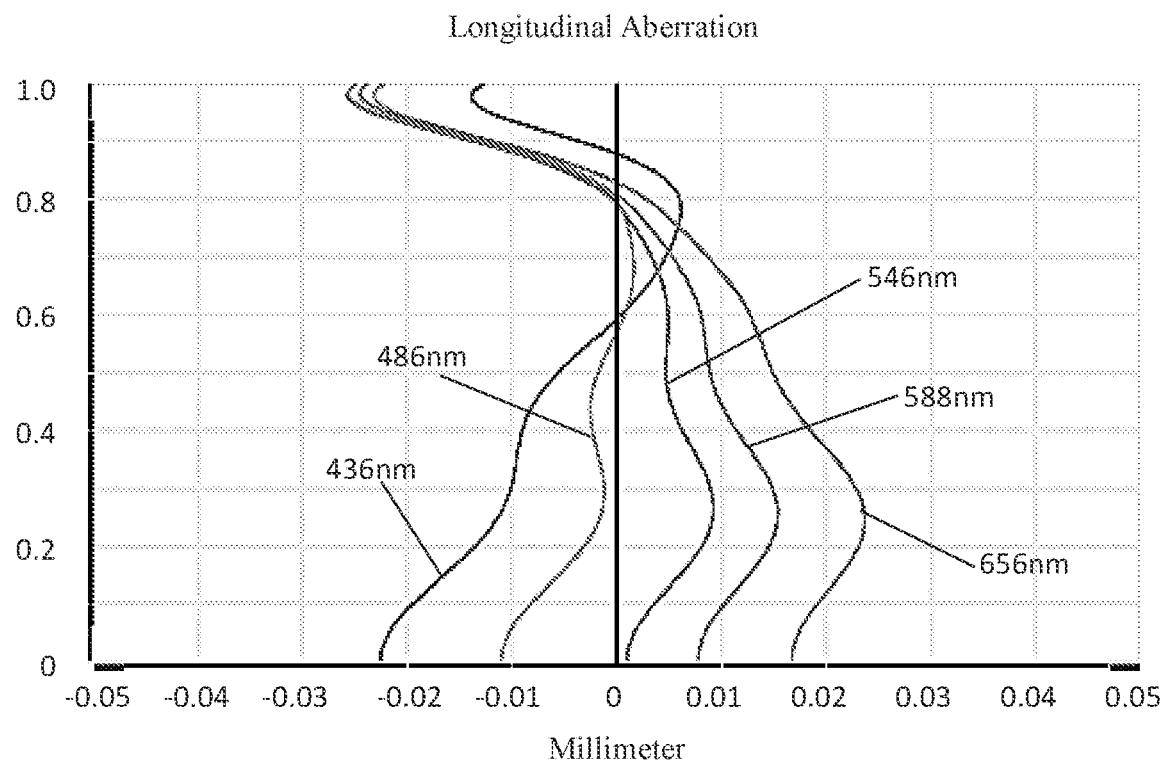
FIG. 2 is a schematic diagram of longitudinal aberration of the camera optical lens shown in FIG. 1.
Figure 3:
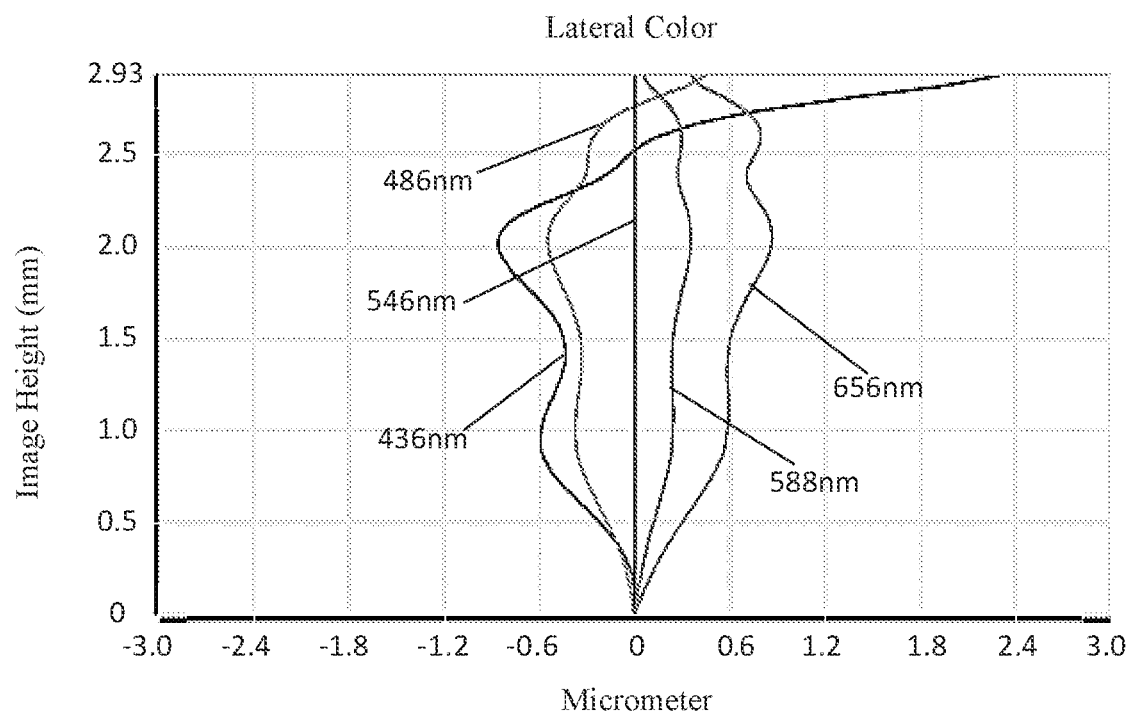
FIG. 3 is a schematic diagram of lateral color of the camera optical lens shown in FIG. 1.
Figure 4:
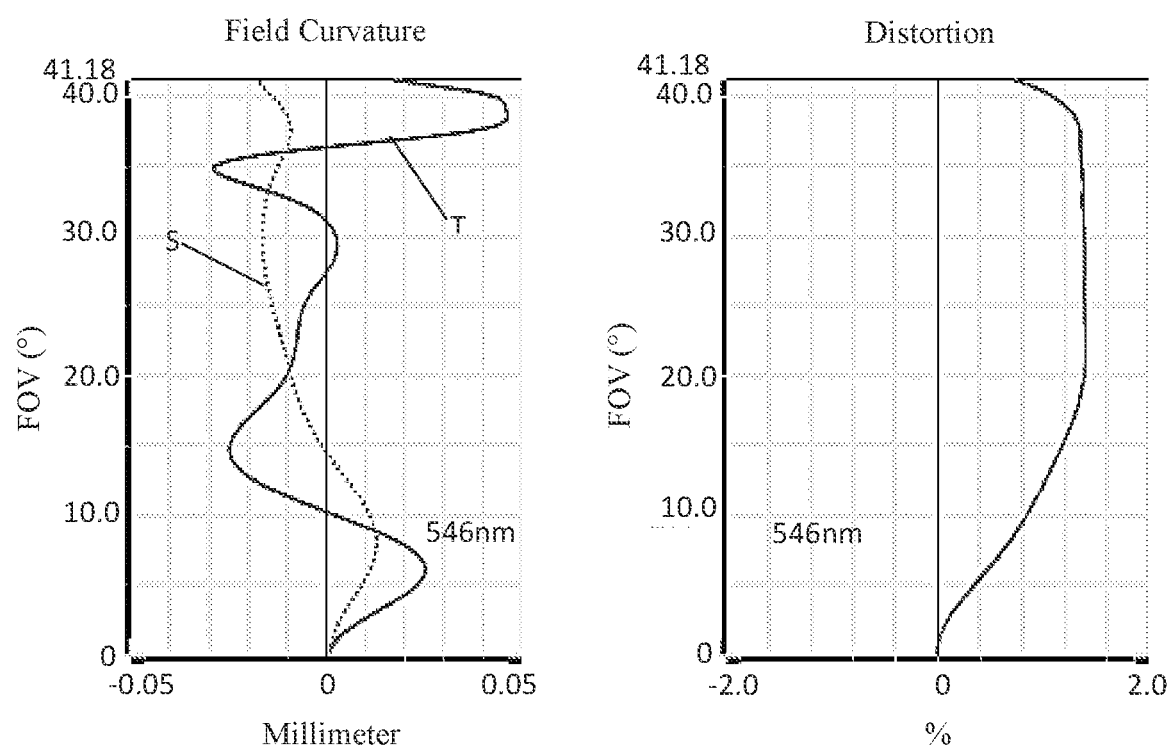
FIG. 4 is a schematic diagram of field curvature and distortion of the camera optical lens shown in FIG. 1.

FIG. 2 and FIG. 3 respectively show schematic diagrams of longitudinal aberration and lateral color of light having wavelengths of 656 nm, 588 nm, 546 nm, 486 nm and 436 nm after passing through the camera optical lens 10. FIG. 4 shows a schematic diagram of field curvature and distortion of light having a wavelength of 546 nm after passing through the camera optical lens 10. In FIG. 4, the field curvature S is the field curvature in a sagittal direction, and the field curvature T is the field curvature in a meridian direction.

In an embodiment, an entrance pupil diameter ENPD of the camera optical lens 10 is 1.314 mm, the full FOV image height IH is 2.930 mm, and the FOV in a diagonal direction is 82.35°, so that the camera optical lens 10 can meet the design requirements of a large aperture, a wide angle and ultra-thinness. The on-axis and off-axis color aberrations are fully corrected, and the camera optical lens 10 has excellent optical performance.

Embodiment 2

Figure 5:
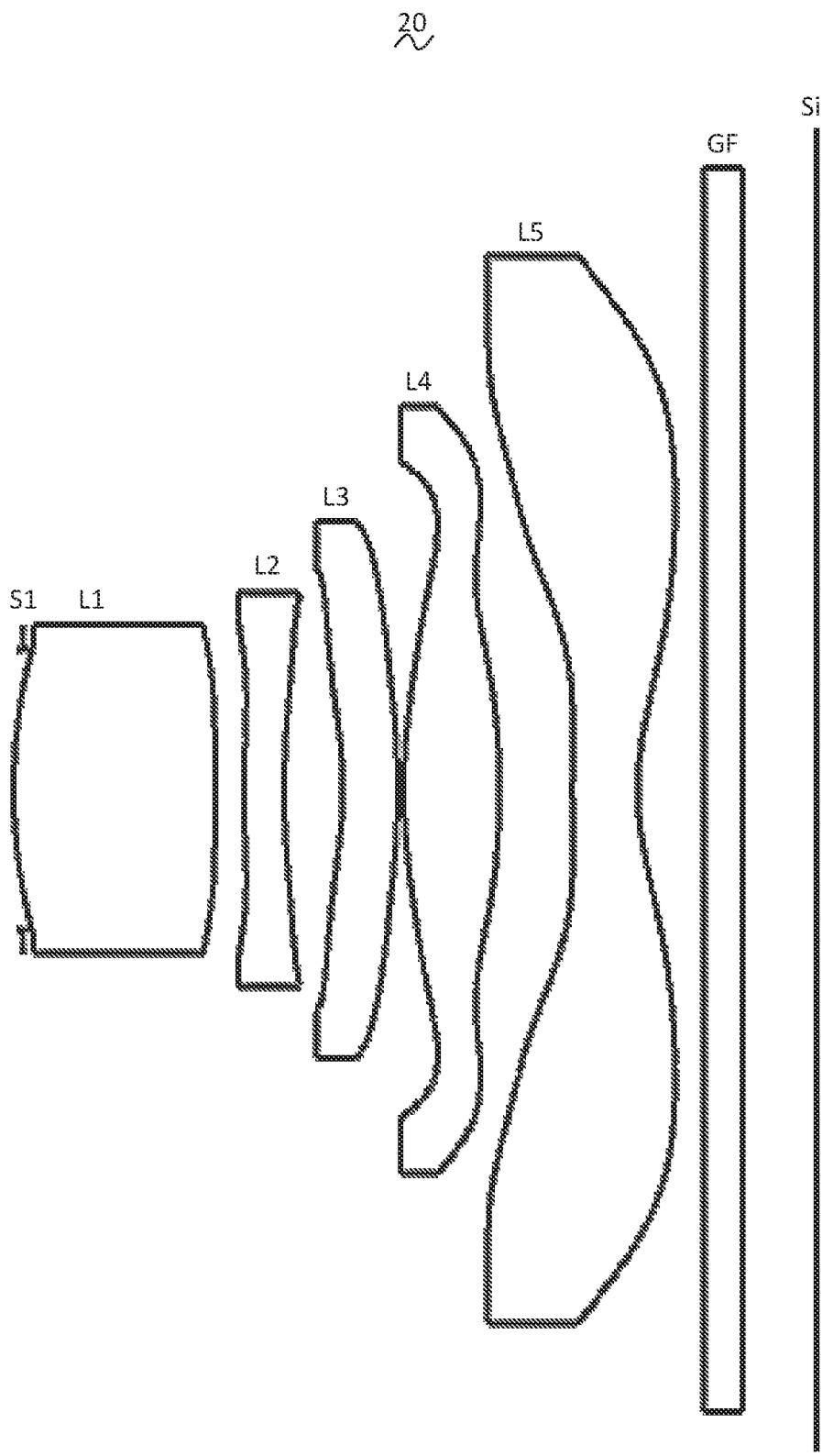
FIG. 5 is a schematic structural diagram of a camera optical lens according to Embodiment 2.

FIG. 5 is a schematic structural diagram of a camera optical lens 20 according to the Embodiment 2. The Embodiment 2 is basically the same as the Embodiment 1. The reference signs listed in the following table have the same representation as the Embodiment 1, so the same part will not be repeated herein, and only a difference thereof will be described in the following.

The first lens L1 includes an image-side surface being concave in the paraxial region.

The fifth lens L5 includes an object-side surface being convex in the paraxial region.

Table 5 and Table 6 show the design data of the camera optical lens 20 according to the Embodiment 2 of the present disclosure.

TABLE 5

|    | R      | d    |        | nd     |     | vd    |     |
|----|--------|------|--------|--------|-----|-------|-----|
| S1 | ∞      | d0=  | −0.055 |        |     |       |     |
| R1 | 2.045  | d1=  | 1.100  | nd1    | 1.5444 | v1 | 55.82 |
| R2 | 39.265 | d2=  | 0.156  |        |     |       |     |

TABLE 5-continued

|     | R      | d    |       | nd   |        | vd  |       |
|-----|--------|------|-------|------|--------|-----|-------|
| R3  | 3.034  | d3=  | 0.220 | nd2  | 1.6700 | v2  | 19.39 |
| R4  | 2.838  | d4=  | 0.321 |      |        |     |       |
| R5  | −1.432 | d5=  | 0.299 | nd3  | 1.6700 | v3  | 19.39 |
| R6  | −2.858 | d6=  | 0.030 |      |        |     |       |
| R7  | 1.796  | d7=  | 0.525 | nd4  | 1.5444 | v4  | 55.82 |
| R8  | −2.707 | d8=  | 0.397 |      |        |     |       |
| R9  | 8.158  | d9=  | 0.358 | nd5  | 1.5346 | v5  | 55.69 |
| R10 | 1.112  | d10= | 0.364 |      |        |     |       |
| R11 | ∞      | d11= | 0.210 | ndg  | 1.5168 | vg  | 64.17 |
| R12 | ∞      | d12= | 0.401 |      |        |     |       |

Table 6 shows the aspherical surface data of each lens in the camera optical lens 20 according to the Embodiment 2 of the present disclosure.

TABLE 6

|     | Conic coefficient | Aspherical coefficient | | | |
|-----|-------------------|-------------|-------------|-------------|-------------|
|     | k                 | A4          | A6          | A8          | A10         |
| R1  | −1.1822E+01       | 1.1216E−01  | 5.2026E−01  | −8.3082E+00 | 6.3407E+01  |
| R2  | 5.0000E+02        | −4.5534E−01 | 2.3662E+00  | −1.9750E+01 | 1.1010E+02  |
| R3  | −9.8069E+01       | −1.9533E−01 | 2.1093E−01  | −6.8520E+00 | 3.6444E+01  |
| R4  | −7.3745E+01       | 1.4916E−01  | −2.7135E−01 | −2.1695E+00 | 9.7269E+00  |
| R5  | −1.5004E+01       | 5.1317E−02  | 9.5174E−01  | −2.9813E+00 | 3.5324E+00  |
| R6  | −1.2084E+01       | −1.0604E−02 | 2.0503E−02  | 2.0239E+00  | −8.1448E+00 |
| R7  | −2.0519E+01       | −3.8430E−02 | −2.8238E−01 | 1.6106E+00  | −3.3728E+00 |
| R8  | 8.0189E−01        | 9.1695E−02  | −4.2843E−01 | 7.9725E−01  | −3.8876E−01 |
| R9  | −9.9000E+01       | −3.5293E−01 | −4.3045E−02 | 4.0266E−01  | −3.2880E−01 |
| R10 | −3.7599E+00       | −2.6799E−01 | 2.2021E−01  | −1.3170E−01 | 6.0478E−02  |

|     | Aspherical coefficient | | | | |
|-----|-------------|-------------|-------------|-------------|-------------|
|     | A12         | A14         | A16         | A18         | A20         |
| R1  | −3.0465E+02 | 9.3086E+02  | −1.7474E+03 | 1.8335E+03  | −8.2214E+02 |
| R2  | −3.9776E+02 | 9.2864E+02  | −1.3477E+03 | 1.1038E+03  | −3.8956E+02 |
| R3  | −1.0076E+02 | 1.7622E+02  | −1.9441E+02 | 1.2255E+02  | −3.3418E+01 |
| R4  | −1.6647E+01 | 1.2915E+01  | −1.3661E+00 | −4.3023E+00 | 2.0166E+00  |
| R5  | −1.7184E+00 | 1.5829E+00  | −3.9016E+00 | 3.7629E+00  | −1.2219E+00 |
| R6  | 1.4176E+01  | −1.3513E+01 | 7.3736E+00  | −2.1736E+00 | 2.6923E−01  |
| R7  | 3.9204E+00  | −2.7550E+00 | 1.1582E+00  | −2.6756E−01 | 2.6069E−02  |
| R8  | −1.6431E−01 | 2.4867E−01  | −1.0649E−01 | 2.0749E−02  | −1.5700E−03 |
| R9  | 1.3003E−01  | −2.8952E−02 | 3.6494E−03  | −2.3674E−04 | 5.7742E−06  |
| R10 | −2.0306E−02 | 4.5878E−03  | −6.4776E−04 | 5.1332E−05  | −1.7387E−06 |

Table 7 and Table 8 show the design data of the inflexion point and arrest point of each lens of the camera optical lens 20.

TABLE 7

|  | Number of inflexion points | Inflexion point position 1 | Inflexion point position 2 | Inflexion point position 3 | Inflexion point position4 | Inflexion point position5 |
|---|---|---|---|---|---|---|
| P1R1 | 0 | / | / | / | / | / |
| P1R2 | 1 | 0.075 | / | / | / | / |
| P2R1 | 2 | 0.245 | 0.705 | / | / | / |
| P2R2 | 2 | 0.435 | 0.635 | / | / | / |
| P3R1 | 2 | 0.365 | 0.765 | / | / | / |
| P3R2 | 2 | 0.495 | 0.595 | / | / | / |
| P4R1 | 2 | 0.955 | 1.515 | / | / | / |
| P4R2 | 2 | 0.685 | 1.165 | / | / | / |
| P5R1 | 5 | 0.165 | 0.965 | 1.425 | 1.615 | 2.115 |
| P5R2 | 3 | 0.495 | 2.345 | 2.405 | / | / |

TABLE 8

|  | Number of arrest points | Arrest point position 1 | Arrest point position 2 |
|---|---|---|---|
| P1R1 | 0 | / | / |
| P1R2 | 1 | 0.125 | / |
| P2R1 | 1 | 0.425 | / |
| P2R2 | 0 | / | / |
| P3R1 | 0 | / | / |
| P3R2 | 0 | / | / |
| P4R1 | 1 | 1.235 | / |
| P4R2 | 2 | 0.995 | 1.335 |
| P5R1 | 1 | 0.285 | / |
| P5R2 | 1 | 1.335 | / |

In addition, in the following Table 17, the values corresponding to the various parameters in the Embodiment 2 and the parameters specified in the condition are listed. Obviously, the camera optical lens according to this embodiment satisfies the above-mentioned condition.

Figure 6:
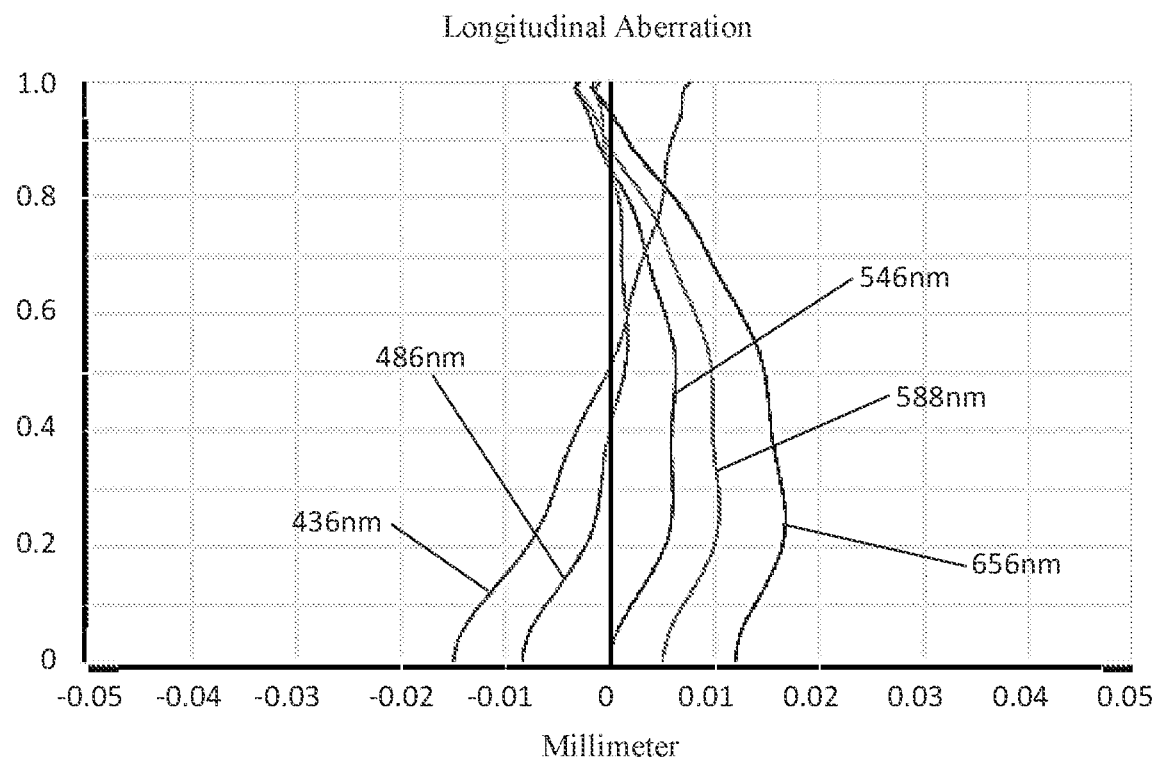
FIG. 6 is a schematic diagram of longitudinal aberration of the camera optical lens shown in FIG. 5.
Figure 7:
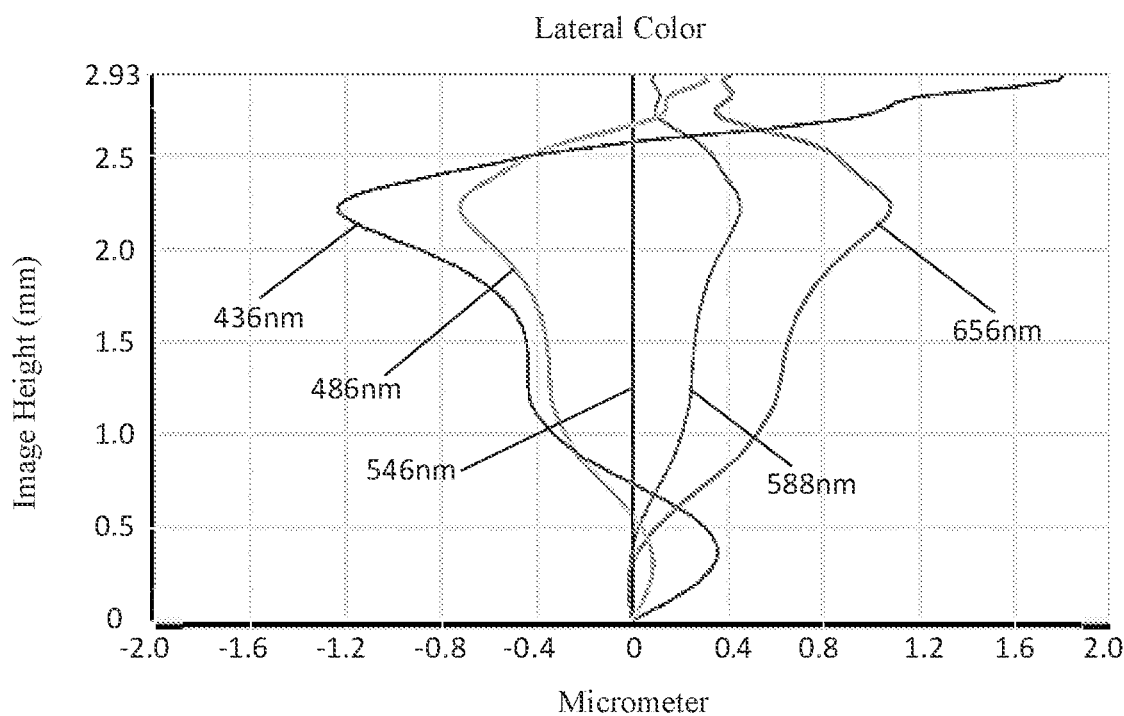
FIG. 7 is a schematic diagram of lateral color of the camera optical lens shown in FIG. 5.
Figure 8:
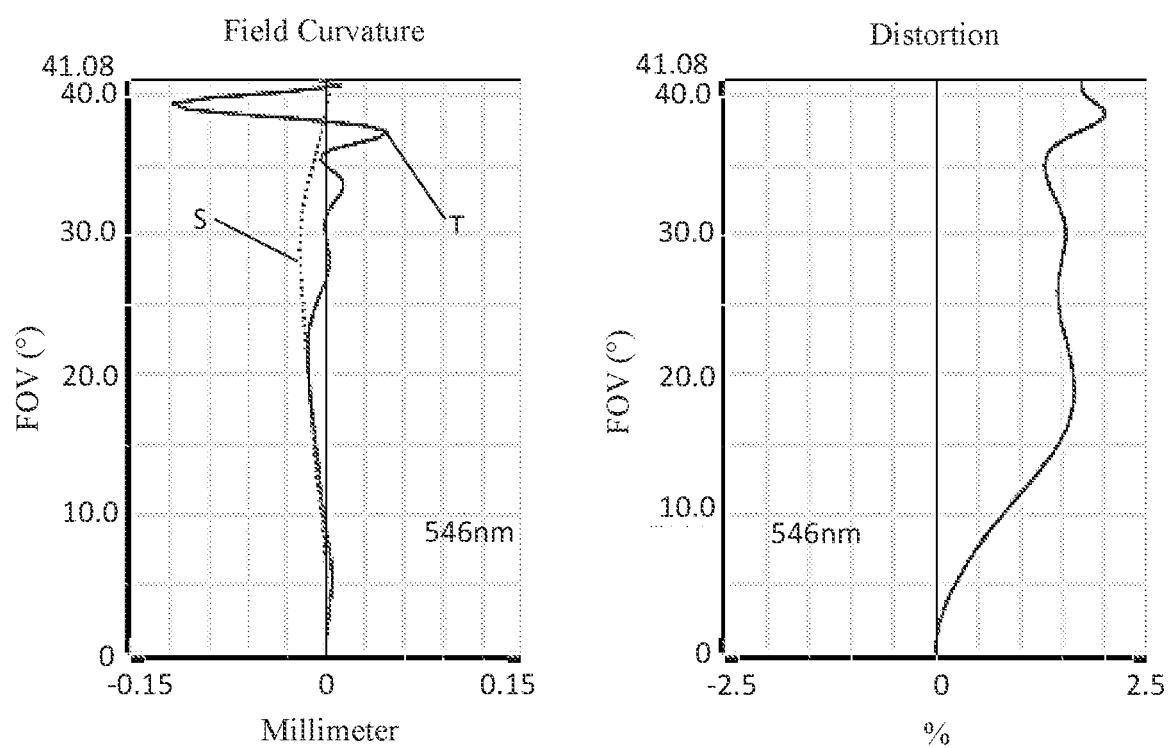
FIG. 8 is a schematic diagram of field curvature and distortion of the camera optical lens shown in FIG. 5.

FIG. 6 and FIG. 7 respectively show schematic diagrams of longitudinal aberration and lateral color of light having wavelengths of 656 nm, 588 nm, 546 nm, 486 nm and 436 nm after passing through the camera optical lens 20. FIG. 8 shows a schematic diagram of field curvature and distortion of light having a wavelength of 546 nm after passing through the camera optical lens 20. In FIG. 8, the field curvature S is the field curvature in a sagittal direction, and the field curvature T is the field curvature in a meridian direction.

In this embodiment, an entrance pupil diameter ENPD of the camera optical lens 20 is 1.306 mm, the full FOV image height IH is 2.930 mm, and the FOV in a diagonal direction is 82.15°, so that the camera optical lens 20 can meet the design requirements of a large aperture, a wide angle and ultra-thinness. The on-axis and off-axis color aberrations are fully corrected, and the camera optical lens 20 has excellent optical performance.

Embodiment 3

Figure 9:
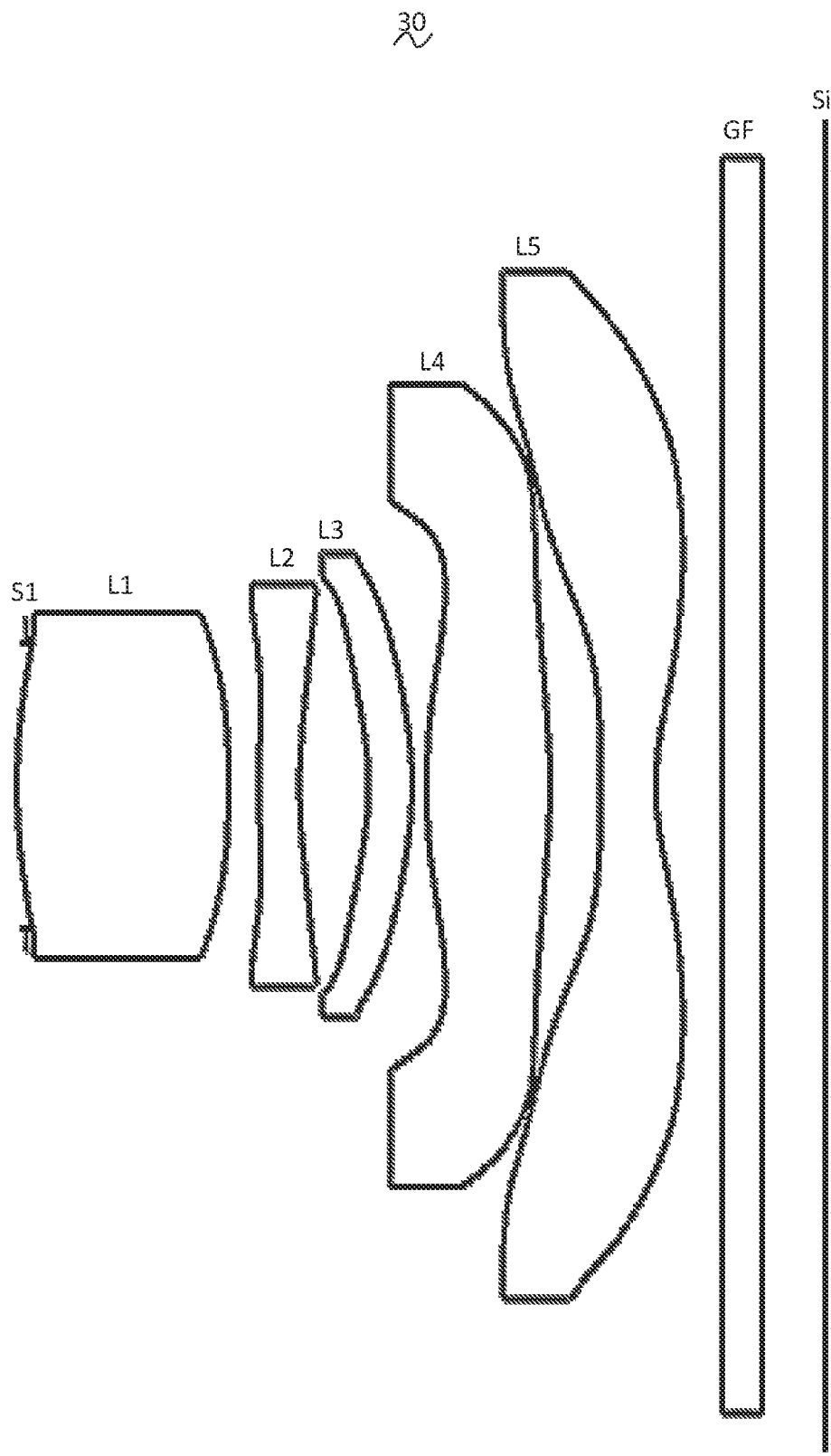
FIG. 9 is a schematic structural diagram of a camera optical lens according to Embodiment 3.

FIG. 9 is a schematic structural diagram of a camera optical lens 30 according to the Embodiment 3. The Embodiment 3 is basically the same as the Embodiment 1.

Table 9 and Table 10 show the design data of the camera optical lens 30 according to the Embodiment 3 of the present disclosure.

TABLE 9

|  | R | d |  | nd |  | vd |
|---|---|---|---|---|---|---|
| S1 | ∞ | d0= | −0.055 |  |  |  |
| R1 | 2.388 | d1= | 1.149 | nd1 | 1.5444 v1 | 55.82 |
| R2 | −4.202 | d2= | 0.163 |  |  |  |
| R3 | 3.260 | d3= | 0.221 | nd2 | 1.6700 v2 | 19.39 |
| R4 | 2.175 | d4= | 0.374 |  |  |  |
| R5 | −1.170 | d5= | 0.236 | nd3 | 1.6700 v3 | 19.39 |
| R6 | −1.338 | d6= | 0.078 |  |  |  |
| R7 | 3.346 | d7= | 0.669 | nd4 | 1.5444 v4 | 55.82 |
| R8 | −2.345 | d8= | 0.273 |  |  |  |
| R9 | −21.681 | d9= | 0.300 | nd5 | 1.5346 v5 | 55.69 |
| R10 | 1.027 | d10= | 0.364 |  |  |  |
| R11 | ∞ | d11= | 0.210 | ndg | 1.5168 vg | 64.17 |
| R12 | ∞ | d12= | 0.344 |  |  |  |

Table 10 shows the aspherical surface data of each lens of the camera optical lens 30 according to the Embodiment 3 of the present disclosure.

TABLE 10

|  | Conic coefficient | Aspherical coefficient | | | |
|---|---|---|---|---|---|
|  | k | A4 | A6 | A8 | A10 |
| R1 | −1.6029E+01 | 8.8350E−02 | 1.1628E−01 | −3.2887E+00 | 2.5071E+01 |
| R2 | −8.1968E+00 | −4.1435E−01 | 8.5959E−01 | −4.5195E+00 | 2.5926E+01 |
| R3 | −7.9232E+01 | −3.2024E−01 | −5.1709E−01 | 9.8735E−01 | 6.9510E+00 |
| R4 | −6.1889E+01 | 4.2720E−01 | −2.9176E+00 | 1.0099E+01 | −2.2713E+01 |
| R5 | −9.6902E+00 | 4.1667E−02 | 1.8096E+00 | −1.3679E+01 | 5.3507E+01 |
| R6 | −7.2176E+00 | 5.6063E−01 | −2.5318E+00 | 5.4925E+00 | −6.8350E+00 |
| R7 | −4.6425E+00 | 6.1558E−01 | −3.2029E+00 | 8.5902E+00 | −1.5251E+01 |
| R8 | 2.9899E−01 | 5.1344E−01 | −1.0662E+00 | 1.4475E+00 | −1.1921E+00 |

TABLE 10-continued

| | | | | |
|---|---|---|---|---|
| R9 | 9.8298E+01 | −3.2796E−01 | −3.3992E−03 | 3.7386E−01 | −3.4182E−01 |
| R10 | −6.8494E+00 | −2.9052E−01 | 3.1099E−01 | −2.4383E−01 | 1.3989E−01 |

| Aspherical coefficient | | | | |
|---|---|---|---|---|
| A12 | A14 | A16 | A18 | A20 |
| R1 | −1.1787E+02 | 3.4987E+02 | −6.3503E+02 | 6.4221E+02 | −2.7711E+02 |
| R2 | −9.6146E+01 | 2.2060E+02 | −3.0553E+02 | 2.3452E+02 | −7.6725E+01 |
| R3 | −2.9716E+01 | 5.3778E+01 | −5.2570E+01 | 2.6957E+01 | −5.7178E+00 |
| R4 | 3.5877E+01 | −3.9170E+01 | 2.7166E+01 | −1.0072E+01 | 1.2451E+00 |
| R5 | −1.3010E+02 | 2.0078E+02 | −1.9090E+02 | 1.0170E+02 | −2.3241E+01 |
| R6 | 4.6294E+00 | −2.0512E+00 | 2.1480E+00 | −2.3271E+00 | 8.8522E−01 |
| R7 | 1.8321E+01 | −1.4752E+01 | 7.6062E+00 | −2.2657E+00 | 2.9548E−01 |
| R8 | 6.1235E−01 | −1.9812E−01 | 3.8999E−02 | −4.2185E−03 | 1.8913E−04 |
| R9 | 1.5200E−01 | −3.9427E−02 | 6.1219E−03 | −5.3187E−04 | 2.0021E−05 |
| R10 | −5.6477E−02 | 1.5037E−02 | −2.4659E−03 | 2.2378E−04 | −8.5630E−06 |

Table 11 and Table 12 show the design data of the inflexion point and the arrest point of each lens of the camera optical lens 30.

TABLE 11

| | Number of inflexion points | Inflexion point position 1 | Inflexion point position 2 | Inflexion point position 3 | Inflexion point position4 |
|---|---|---|---|---|---|
| P1R1 | 1 | 0.665 | / | / | / |
| P1R2 | 0 | / | / | / | / |
| P2R1 | 2 | 0.215 | 0.715 | / | / |
| P2R2 | 3 | 0.435 | 0.615 | 0.775 | / |
| P3R1 | 0 | / | / | / | / |
| P3R2 | 1 | 0.995 | / | / | / |
| P4R1 | 2 | 0.535 | 1.285 | / | / |
| P4R2 | 2 | 0.675 | 1.115 | / | / |
| P5R1 | 4 | 0.935 | 1.415 | 1.695 | 2.105 |
| P5R2 | 3 | 0.405 | 2.225 | 2.345 | / |

TABLE 12

| | Number of arrest points | Arrest point position 1 |
|---|---|---|
| P1R1 | 0 | / |
| P1R2 | 0 | / |
| P2R1 | 1 | 0.385 |
| P2R2 | 1 | 0.905 |
| P3R1 | 0 | / |
| P3R2 | 1 | 1.065 |
| P4R1 | 1 | 0.915 |
| P4R2 | 0 | / |
| P5R1 | 0 | / |
| P5R2 | 1 | 1.075 |

In addition, in the following Table 17, the values corresponding to the various parameters in the Embodiment 3 and the parameters specified in the condition are listed. Obviously, the camera optical lens according to this embodiment satisfies the above-mentioned condition.

Figure 10:
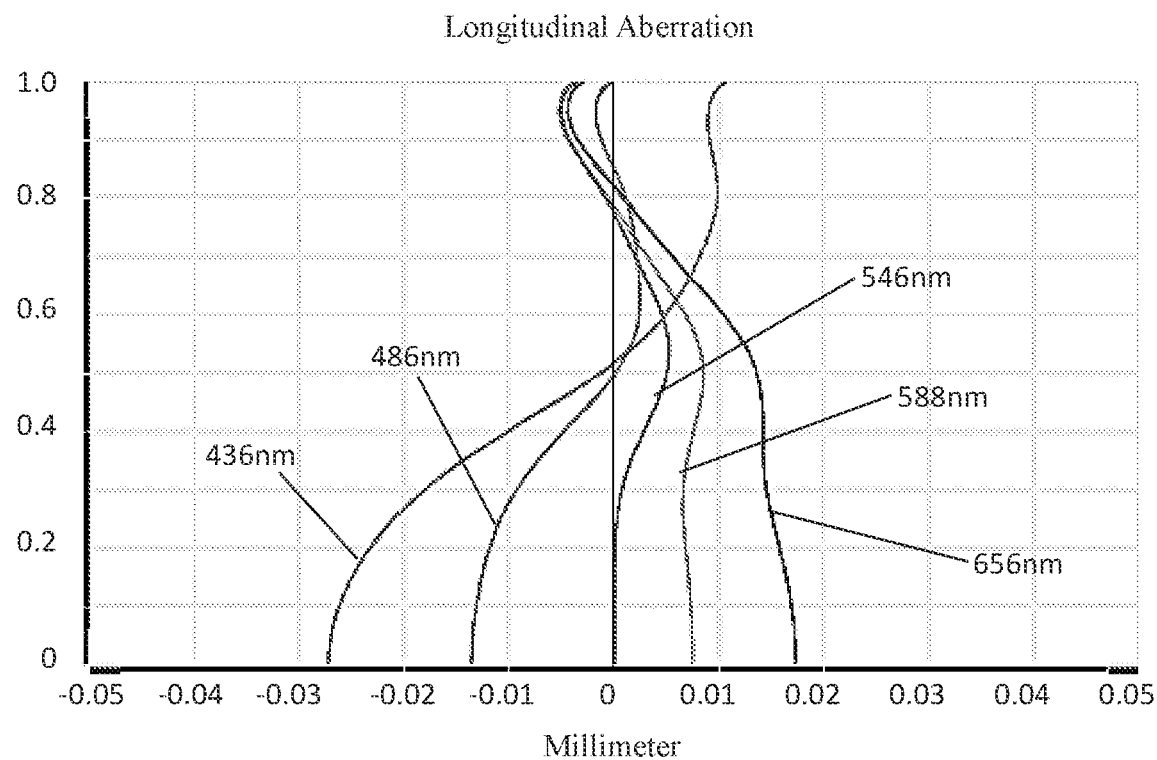
FIG. 10 is a schematic diagram of longitudinal aberration of the camera optical lens shown in FIG. 9.
Figure 11:
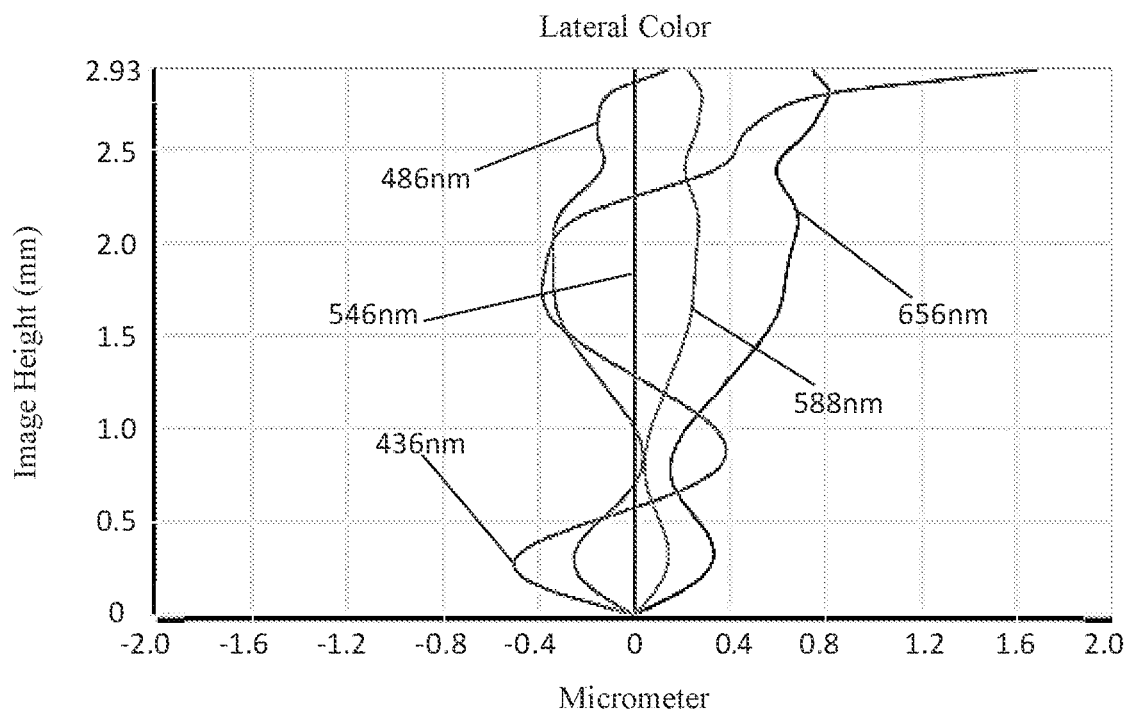
FIG. 11 is a schematic diagram of lateral color of the camera optical lens shown in FIG. 9.
Figure 12:
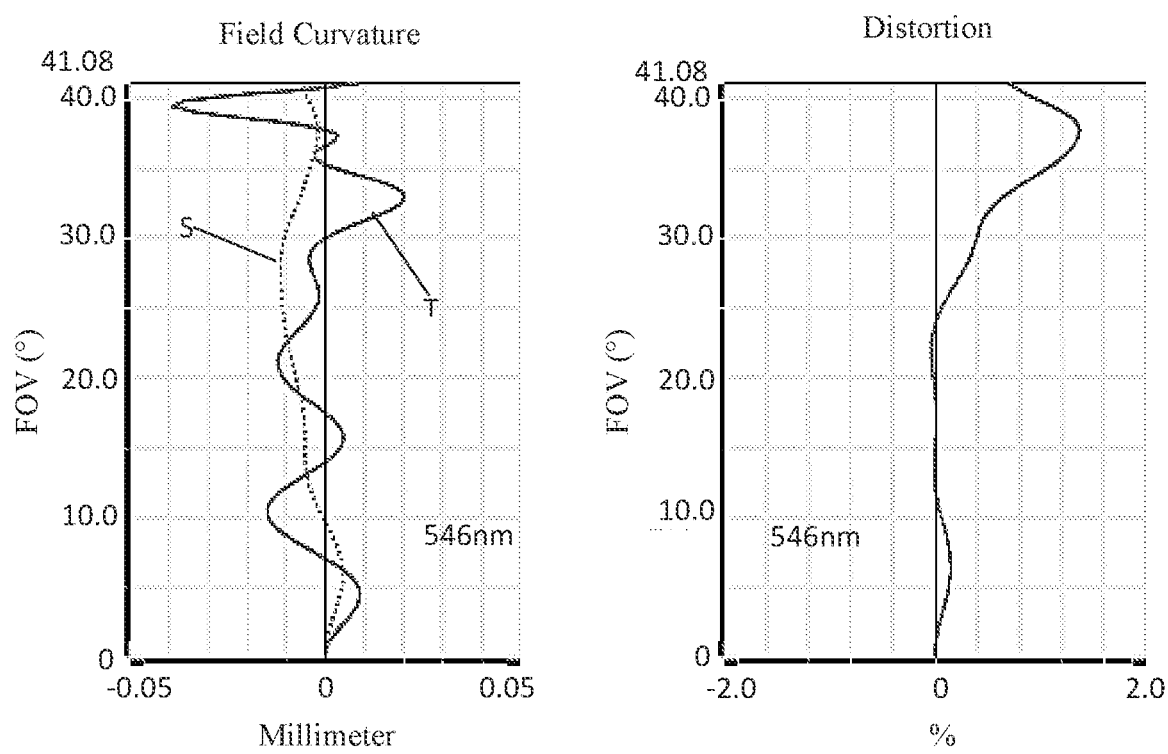
FIG. 12 is a schematic diagram of field curvature and distortion of the camera optical lens shown in FIG. 9.

FIG. 10 and FIG. 11 respectively show schematic diagrams of longitudinal aberration and lateral color of light having wavelengths of 656 nm, 588 nm, 546 nm, 486 nm and 436 nm after passing through the camera optical lens 30. FIG. 12 shows a schematic diagram of field curvature and distortion of light having a wavelength of 546 nm after passing through the camera optical lens 30. In FIG. 12, the field curvature S is the field curvature in a sagittal direction, and the field curvature T is the field curvature in a meridian direction.

In this embodiment, an entrance pupil diameter ENPD of the camera optical lens 30 is 1.318 mm, the full FOV image height IH is 2.930 mm, and the FOV in a diagonal direction is 82.15°, so that the camera optical lens 30 can meet the design requirements of a large aperture, a wide angle and ultra-thinness. The on-axis and off-axis color aberration are fully corrected, and the camera optical lens 30 has excellent optical performance.

Embodiment 4

Figure 13:
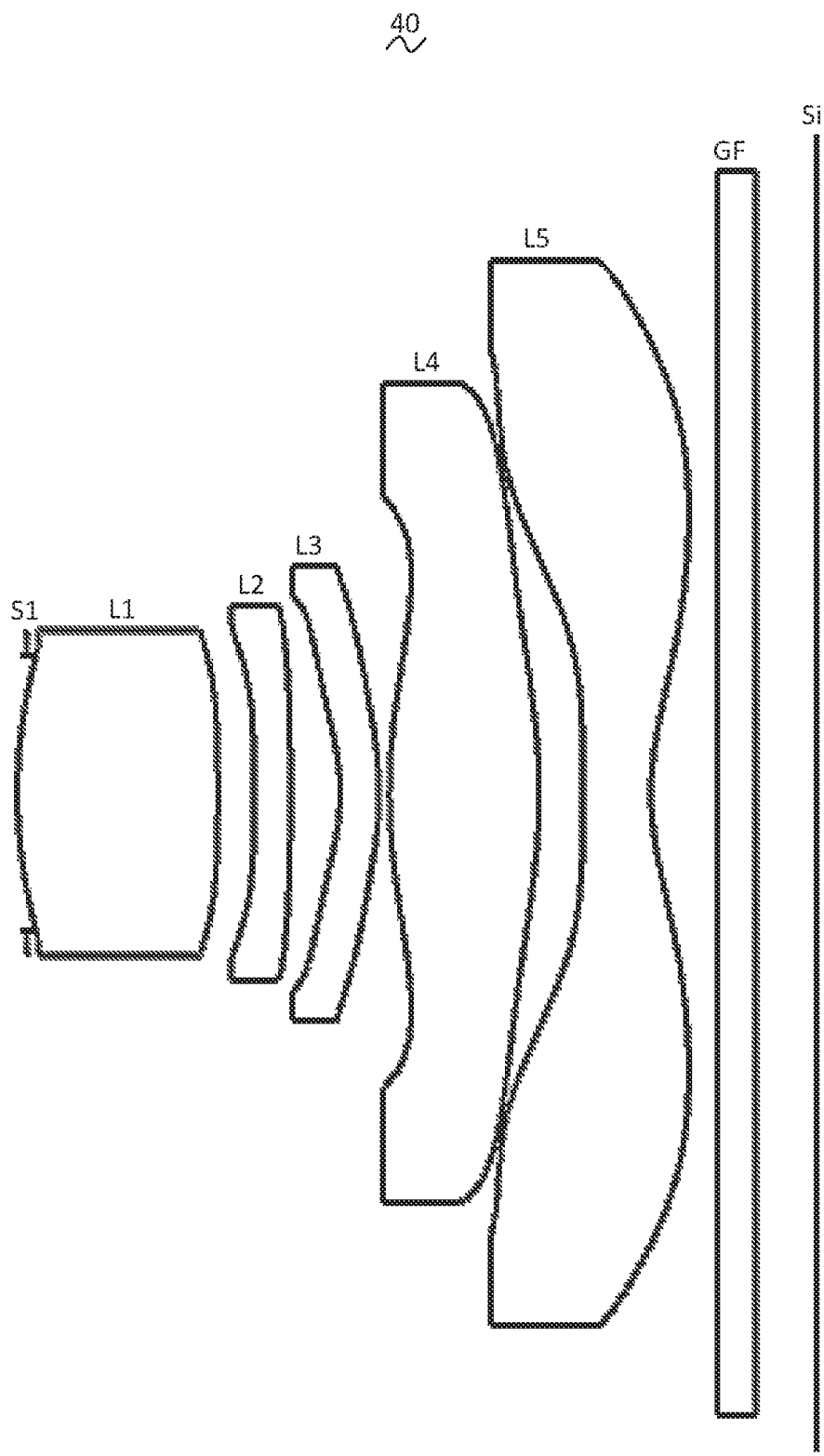
FIG. 13 is a schematic structural diagram of a camera optical lens according to Embodiment 4.

FIG. 13 is a schematic structural diagram of a camera optical lens 40 according to the Embodiment 4. The Embodiment 4 is basically the same as the Embodiment 1. The reference signs listed in the following table have the same representation as the Embodiment 1, so the same part will not be repeated herein, and only a difference thereof will be described in the following.

In this embodiment, the second lens L2 includes an object-side surface being concave in a paraxial region and an image-side surface being convex in the paraxial region.

In this embodiment, the second lens L2 has a positive refractive power.

Table 13 shows the design data of the camera optical lens 40 according to the Embodiment 4 of the present disclosure.

TABLE 13

| | R | d | | nd | | vd | |
|---|---|---|---|---|---|---|---|
| S1 | ∞ | d0= | −0.055 | | | | |
| R1 | 1.977 | d1= | 1.100 | nd1 | 1.5444 | v1 | 55.82 |
| R2 | −10.390 | d2= | 0.199 | | | | |
| R3 | −13.767 | d3= | 0.200 | nd2 | 1.6700 | v2 | 19.39 |
| R4 | −9.186 | d4= | 0.274 | | | | |
| R5 | −0.803 | d5= | 0.213 | nd3 | 1.6700 | v3 | 19.39 |
| R6 | −1.246 | d6= | 0.056 | | | | |
| R7 | 2.167 | d7= | 0.824 | nd4 | 1.5444 | v4 | 55.82 |
| R8 | −2.156 | d8= | 0.239 | | | | |
| R9 | −20.998 | d9= | 0.374 | nd5 | 1.5346 | v5 | 55.69 |
| R10 | 1.113 | d10= | 0.364 | | | | |
| R11 | ∞ | d11= | 0.210 | ndg | 1.5168 | vg | 64.17 |
| R12 | ∞ | d12= | 0.334 | | | | |

Table 14 shows the aspherical surface data of each lens of the camera optical lens 40 according to the Embodiment 4 of the present disclosure.

TABLE 14

| | Conic coefficient | Aspherical coefficient | | | |
|---|---|---|---|---|---|
| | k | A4 | A6 | A8 | A10 |
| R1 | −1.1412E+01 | 1.2776E−01 | 4.2378E−01 | −7.7861E+00 | 6.0831E+01 |
| R2 | −3.0357E+01 | −2.0620E−01 | −2.6937E−01 | 9.6381E−01 | −2.6268E+00 |
| R3 | 9.9000E+01 | −2.3784E−01 | −2.8616E−01 | −1.6151E+00 | 6.0403E+00 |
| R4 | 8.3373E+01 | 9.2391E−02 | 2.2307E−01 | −3.9350E+00 | 1.4042E+01 |
| R5 | −7.6652E+00 | −2.1098E−01 | 4.5074E+00 | −2.4950E+01 | 8.2841E+01 |
| R6 | −1.0275E+01 | 1.6559E−01 | 3.0367E−01 | −3.9888E+00 | 1.3211E+01 |
| R7 | −1.1055E+01 | 4.5798E−02 | −3.5248E−01 | 7.7282E−01 | −1.1487E+00 |
| R8 | −8.0762E−02 | 2.4920E−01 | −3.3085E−01 | 3.6641E−01 | −2.4726E−01 |
| R9 | 9.8891E+01 | −1.9598E−01 | −1.9667E−01 | 5.3123E−01 | −4.8952E−01 |
| R10 | −4.3384E+00 | −2.3581E−01 | 1.8902E−01 | −1.0279E−01 | 3.8641E−02 |

| | Aspherical coefficient | | | | |
|---|---|---|---|---|---|
| | A12 | A14 | A16 | A18 | A20 |
| R1 | −2.9225E+02 | 8.8302E+02 | −1.6314E+03 | 1.6822E+03 | −7.4160E+02 |
| R2 | 6.4276E+00 | −9.0273E+00 | 5.1390E+00 | 1.9230E+00 | −2.9691E+00 |
| R3 | 2.5534E+00 | −3.3604E+01 | 5.9150E+01 | −4.6741E+01 | 1.4610E+01 |
| R4 | −2.6774E+01 | 3.4505E+01 | −3.3005E+01 | 2.1235E+01 | −6.5819E+00 |
| R5 | −1.8335E+02 | 2.7012E+02 | −2.5427E+02 | 1.3839E+02 | −3.3344E+01 |
| R6 | −2.4438E+01 | 2.7760E+01 | −1.9054E+01 | 7.1470E+00 | −1.0973E+00 |
| R7 | 1.1732E+00 | −8.3154E−01 | 3.8960E−01 | −1.0783E−01 | 1.3197E−02 |
| R8 | 9.3807E−02 | −1.6954E−02 | 6.8592E−05 | 4.4427E−04 | −4.7961E−05 |
| R9 | 2.5879E−01 | −8.4124E−02 | 1.6528E−02 | −1.7986E−03 | 8.3210E−05 |
| R10 | −1.0212E−02 | 1.8489E−03 | −2.1673E−04 | 1.4796E−05 | −4.4822E−07 |

Table 15 and Table 16 show the design data of the inflexion point and arrest point of each lens of the camera optical lens 40.

TABLE 15

| | Number of inflexion points | Inflexion point position 1 | Inflexion point position 2 |
|---|---|---|---|
| P1R1 | 0 | / | / |
| P1R2 | 0 | / | / |
| P2R1 | 1 | 0.745 | / |
| P2R2 | 0 | / | / |
| P3R1 | 2 | 0.375 | 0.625 |
| P3R2 | 1 | 1.005 | / |
| P4R1 | 2 | 0.585 | 1.385 |
| P4R2 | 2 | 0.735 | 1.155 |
| P5R1 | 2 | 1.115 | 1.865 |
| P5R2 | 1 | 0.495 | / |

TABLE 16

| | Number of arrest points | Arrest point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 1 | 1.015 |
| P4R2 | 0 | / |
| P5R1 | 0 | / |
| P5R2 | 1 | 1.305 |

In addition, in the following Table 17, the values corresponding to the various parameters in the Embodiment 4 and the parameters specified in the condition are listed. Obviously, the camera optical lens according to this embodiment satisfies the above-mentioned condition.

Figure 14:
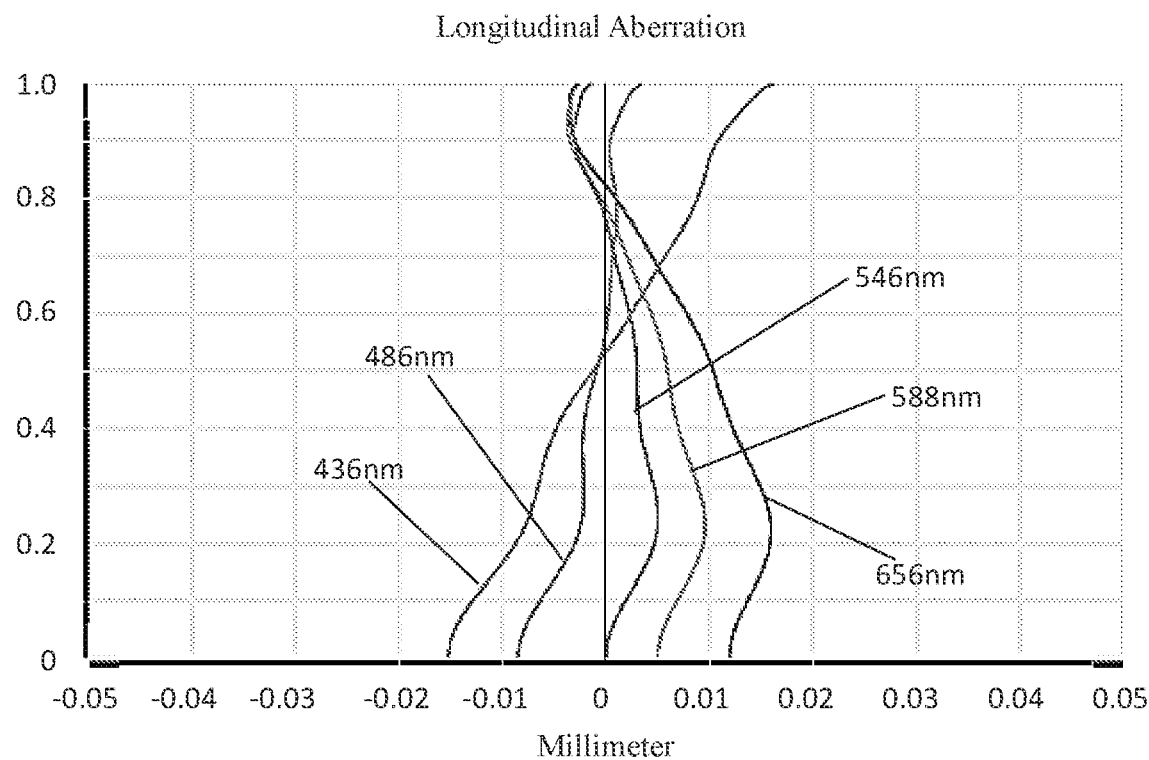
FIG. 14 is a schematic diagram of longitudinal aberration of the camera optical lens shown in FIG. 13.
Figure 15:
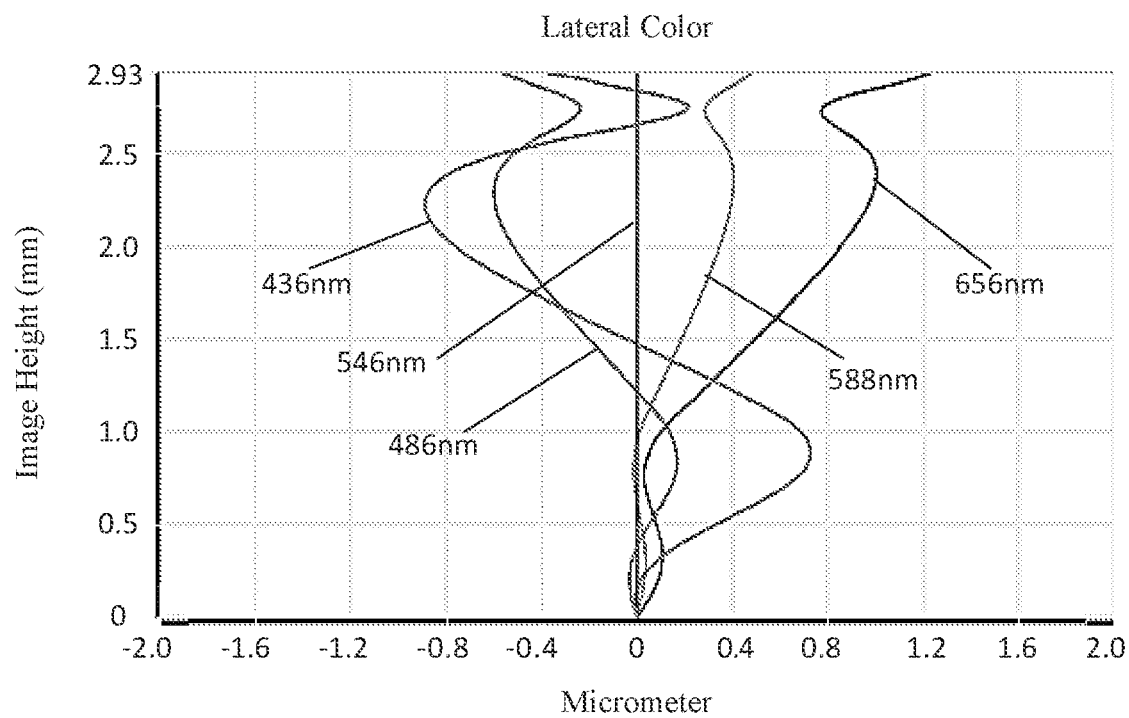
FIG. 15 is a schematic diagram of lateral color of the camera optical lens shown in FIG. 13.
Figure 16:
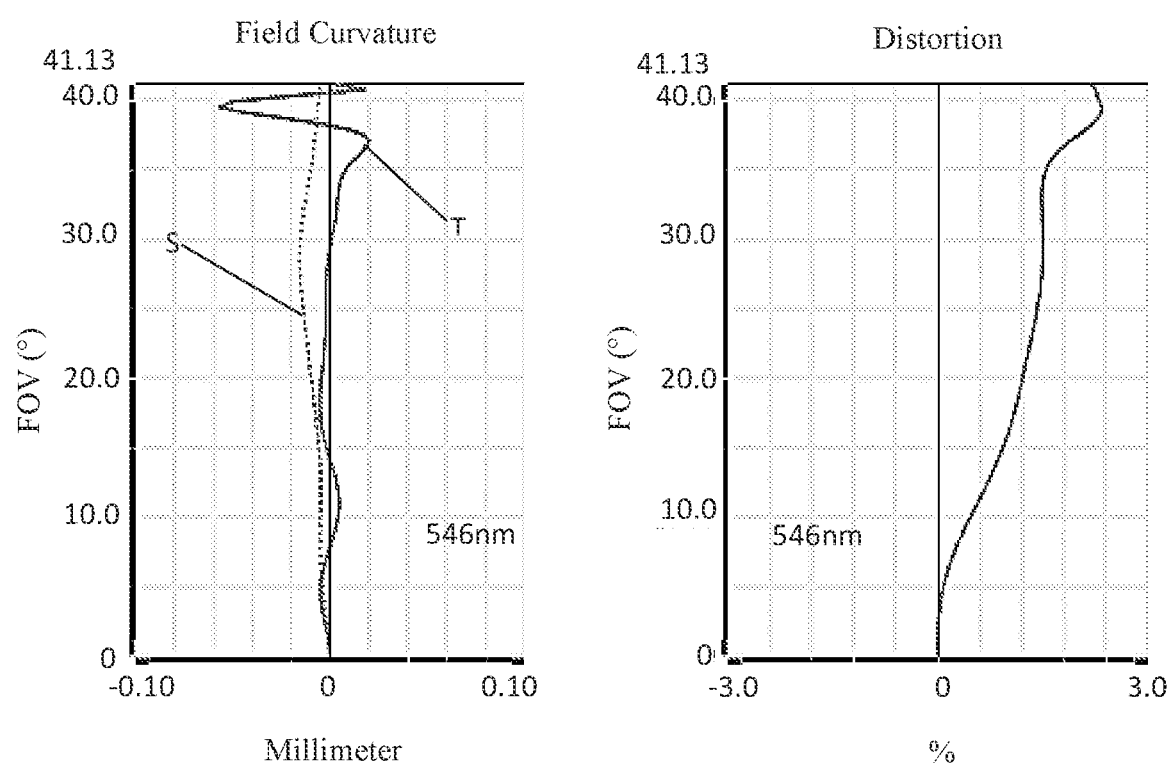
FIG. 16 is a schematic diagram of field curvature and distortion of the camera optical lens shown in FIG. 13.

FIG. 14 and FIG. 15 respectively show schematic diagrams of longitudinal aberration and lateral color of light having wavelengths of 656 nm, 588 nm, 546 nm, 486 nm and 436 nm after passing through the camera optical lens 40. FIG. 16 shows a schematic diagram of field curvature and distortion of light having a wavelength of 546 nm after passing through the camera optical lens 40. In FIG. 16, the field curvature S is the field curvature in a sagittal direction, and the field curvature T is the field curvature in a meridian direction.

In this embodiment, an entrance pupil diameter ENPD of the camera optical lens 40 is 1.297 mm, the full FOV image height IH is 2.930 mm, and the FOV in a diagonal direction is 82.26°, so that the camera optical lens 40 can meet the design requirements of a large aperture, a wide angle and ultra-thinness. The on-axis and off-axis color aberrations are fully corrected, and the camera optical lens 40 has excellent optical performance.

The following Table 17 lists the values of the respective condition in the Embodiment 1, the Embodiment 2, the Embodiment 3, and the Embodiment 4, and the values of other related parameters based on the above-mentioned respective condition.

TABLE 17

| Parameters and conditions | Embodiment 1 | Embodiment 2 | Embodiment 3 | Embodiment 4 |
|---|---|---|---|---|
| f1/f | 1.09 | 1.20 | 0.90 | 0.97 |
| (R3 + R4)/(R3 − R4) | 25.83 | 29.96 | 5.01 | 5.01 |
| d5/d6 | 8.23 | 9.97 | 3.03 | 3.80 |
| (R5 + R6)/(R5 − R6) | −4.70 | −3.01 | −14.93 | −4.63 |
| f | 3.285 | 3.265 | 3.294 | 3.242 |
| f1 | 3.587 | 3.905 | 2.968 | 3.136 |
| f2 | −96.570 | −118.713 | −10.502 | 40.000 |
| f3 | −5.625 | −4.628 | −31.691 | −4.136 |
| f4 | 2.108 | 2.060 | 2.631 | 2.120 |
| f5 | −2.030 | −2.442 | −1.818 | −1.957 |

TABLE 17-continued

| Parameters and conditions | Embodiment 1 | Embodiment 2 | Embodiment 3 | Embodiment 4 |
|---|---|---|---|---|
| f12 | 3.583 | 3.881 | 3.611 | 2.989 |
| FNO | 2.50 | 2.50 | 2.50 | 2.50 |
| TTL | 4.372 | 4.381 | 4.381 | 4.387 |
| IH | 2.930 | 2.930 | 2.930 | 2.930 |
| FOV | 82.35° | 82.15° | 82.15° | 82.26° |

An F number (FNO) refers to a ratio of an effective focal length of the camera optical lens to the entrance pupil diameter.

The above description merely illustrates some embodiments of the present disclosure. It should be noted that those skilled in the art may make improvements without departing from a creative concept of the present disclosure, and all these improvements shall fall into a protection scope of the present disclosure.

What is claimed is:

1. A camera optical lens, comprising, from an object side to an image side:
    a first lens having a positive refractive power;
    a second lens having a refractive power;
    a third lens having a negative refractive power;
    a fourth lens having a positive refractive power; and
    a fifth lens having a negative refractive power,
    wherein the camera optical lens satisfies:

$0.90 \leq f1/f \leq 1.20$;

$-0.75 \leq f5/f \leq -0.55$;

$5.00 \leq (R3+R4)/(R3-R4) \leq 30.00$;

$3.00 \leq d5/d6 \leq 10.00$; and $-15.00 \leq (R5+R6)/(R5-R6) \leq -3.00$, where f denotes a focal length of the camera optical lens; f1 denotes a focal length of the first lens; f5 denotes a focal length of the fifth lens; R3 denotes a curvature radius of an object-side surface of the second lens; R4 denotes a curvature radius of an image-side surface of the second lens; R5 denotes a curvature radius of an object-side surface of the third lens; R6 denotes a curvature radius of an image-side surface of the third lens; d5 denotes an on-axis thickness of the third lens; and d6 denotes an on-axis distance from the image-side surface of the third lens to an object-side surface of the fourth lens.

2. The camera optical lens as described in claim 1, further satisfying:

$-2.22 \leq (R1+R2)/(R1-R2) \leq -0.18$; and $0.13 \leq d1/TTL \leq 0.42$, where R1 denotes a curvature radius of an object-side surface of the first lens, R2 denotes a curvature radius of an image-side surface of the first lens, d1 denotes an on-axis thickness of the first lens, and TTL denotes a total optical length from the object-side surface of the first lens to an image plane of the camera optical lens along an optic axis.

3. The camera optical lens as described in claim 1, further satisfying:

$-72.72 \leq f2/f \leq 18.51$; and $0.02 \leq d3/TTL \leq 0.08$, where f2 denotes a focal length of the second lens, d3 denotes an on-axis thickness of the second lens, and TTL denotes a total optical length from an object-side surface of the first lens to an image plane of the camera optical lens along an optic axis.

4. The camera optical lens as described in claim 1, further satisfying:

$-19.24 \leq f3/f \leq -0.85$; and $0.02 \leq d5/TTL \leq 0.10$, where f3 denotes a focal length of the third lens, and TTL denotes a total optical length from an object-side surface of the first lens to an image plane of the camera optical lens along an optic axis.

5. The camera optical lens as described in claim 1, further satisfying:

$0.32 \leq f4/f \leq 1.20$;

$-0.40 \leq (R7+R8)/(R7-R8) \leq 0.26$; and $0.06 \leq d7/TTL \leq 0.28$, where f4 denotes a focal length of the fourth lens, R7 denotes a curvature radius of the object-side surface of the fourth lens, R8 denotes a curvature radius of an image-side surface of the fourth lens, d7 denotes an on-axis thickness of the fourth lens, and TTL denotes a total optical length from an object-side surface of the first lens to an image plane of the camera optical lens along an optic axis.

6. The camera optical lens as described in claim 1, further satisfying:

$0.45 \leq (R9+R10)/(R9-R10) \leq 1.97$; and $0.03 \leq d9/TTL \leq 0.13$, where R9 denotes a curvature radius of an object-side surface of the fifth lens, R10 denotes a curvature radius of an image-side surface of the fifth lens, d9 denotes an on-axis thickness of the fifth lens, and TTL denotes a total optical length from an object-side surface of the first lens to an image plane of the camera optical lens along an optic axis.

7. The camera optical lens as described in claim 1, further satisfying: TTL/IH≤1.50, where IH denotes an image height of the camera optical lens, and TTL denotes a total optical length from an object-side surface of the first lens to an image plane of the camera optical lens along an optic axis.

8. The camera optical lens as described in claim 1, further satisfying: FOV 82.00°, where FOV denotes a field of view of the camera optical lens.

9. The camera optical lens as described in claim 1, further satisfying: $0.46 \leq f12/f \leq 1.78$ where f12 denotes a combined focal length of the first lens and the second lens.

* * * * *